United States Patent
Yamaguchi et al.

(10) Patent No.: US 9,778,029 B2
(45) Date of Patent: *Oct. 3, 2017

(54) SELF-POSITION CALCULATING APPARATUS AND SELF-POSITION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/120,603

(22) PCT Filed: Feb. 24, 2014

(86) PCT No.: PCT/JP2014/054317
§ 371 (c)(1),
(2) Date: Aug. 22, 2016

(87) PCT Pub. No.: WO2015/125301
PCT Pub. Date: Aug. 27, 2015

(65) Prior Publication Data
US 2017/0018087 A1    Jan. 19, 2017

(51) Int. Cl.
*G06K 9/00* (2006.01)
*G01B 11/26* (2006.01)
(Continued)

(52) U.S. Cl.
CPC .............. *G01B 11/26* (2013.01); *B60Q 1/24* (2013.01); *G01B 11/002* (2013.01); *G01C 21/28* (2013.01);
(Continued)

(58) Field of Classification Search
CPC ....... G01B 11/26; G01B 11/002; G06T 7/521; G06T 7/73; G06T 2207/10152;
(Continued)

(56) References Cited

U.S. PATENT DOCUMENTS 3,414,213 A * 12/1968 Eckermann ............ B64G 1/363
244/1 R
2005/0163343 A1 7/2005 Kakinami et al.
(Continued)

FOREIGN PATENT DOCUMENTS

JP   H06325298 A   11/1994
JP   2004198211 A   7/2004
(Continued)

OTHER PUBLICATIONS

R. I. Hartley, "A linear method for reconstruction from lines and points," Proc. 5th International Conference on computer Vision, Cambridge, Massachusetts, pp. 882-887 (1995).
(Continued)

*Primary Examiner* — Shefali Goradia
(74) *Attorney, Agent, or Firm* — Young Basile Hanlon & MacFarlane, P.C.

(57) ABSTRACT

A self-position calculating apparatus includes: a light projector configured to project a patterned light beam onto a road surface around a vehicle; an image capturing unit configured to capture and obtain an image of the road surface around the vehicle covering an area of the projected patterned light beam; an orientation angle calculator configured to calculate an orientation angle of the vehicle relative to the road surface from; a feature point detector configured to detect multiple feature points on the road surface; an orientation change amount calculator configured to calculate an amount of change in the orientation of the vehicle; and a self-position calculator configured to calculate
(Continued)

a current position and a current orientation angle of the vehicle. The light projector selectively projects the patterned light beam onto a specific patterned light beam-projected region out of the multiple patterned light beam-projected regions.

6 Claims, 29 Drawing Sheets

(51) Int. Cl.
    *G01C 21/28* (2006.01)
    *B60Q 1/24* (2006.01)
    *G06T 7/73* (2017.01)
    *G06T 7/521* (2017.01)
    *G01B 11/00* (2006.01)

(52) U.S. Cl.
    CPC ............... *G06T 7/521* (2017.01); *G06T 7/73* (2017.01); *G06T 2207/10152* (2013.01); *G06T 2207/30244* (2013.01); *G06T 2207/30252* (2013.01)

(58) Field of Classification Search
    CPC .......... G06T 2207/30244; G06T 2207/30252; B60Q 1/24; G01C 21/28
    See application file for complete search history.

(56) References Cited

U.S. PATENT DOCUMENTS

| | | | | |
|---|---|---|---|---|
| 2012/0154785 A1* | 6/2012 | Gilliland | ............... | G01S 7/4813 356/5.01 |
| 2013/0182906 A1 | 7/2013 | Kojo et al. | | |
| 2013/0297197 A1* | 11/2013 | Zhai | ..................... | B60W 30/12 701/408 |
| 2015/0078624 A1* | 3/2015 | Fukuda | ..................... | B60R 1/00 382/104 |

FOREIGN PATENT DOCUMENTS

| | | |
|---|---|---|
| JP | 2004198212 A | 7/2004 |
| JP | 2007256090 A | 10/2007 |
| JP | 2007278951 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |

OTHER PUBLICATIONS

D. G. Lowe, "Distinctive Image Features from Scale-Invariant Keypoints," Int. J. Comput. Vis., vol. 60, No. 2, pp. 91-110, Nov. 2004.

Yasushi Kanazawa, et al., "Detection of Feature Points for Computer Vision", IEICE Journal, Dec. 2004, pp. 1043-1048, vol. 87, No. 12.

* cited by examiner

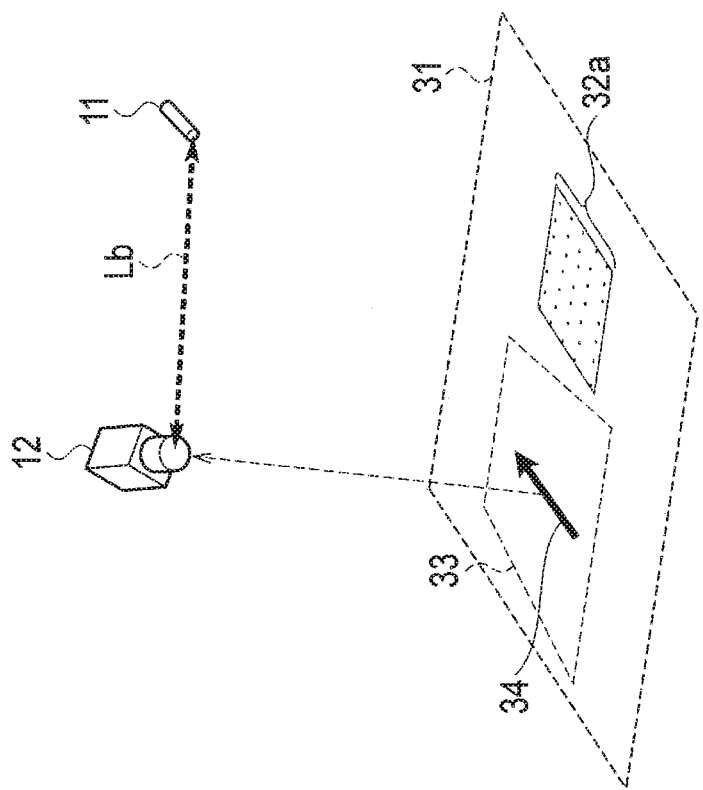
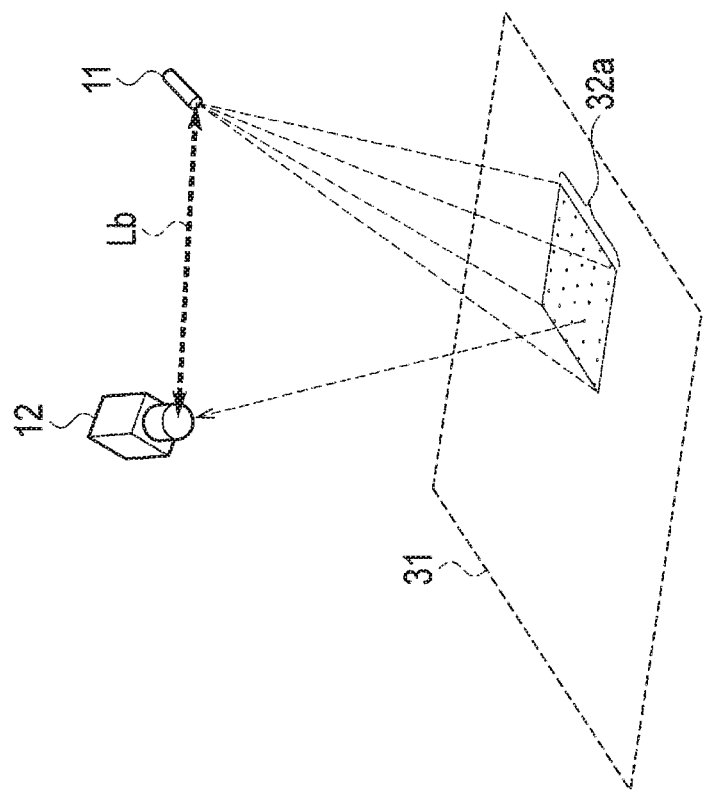

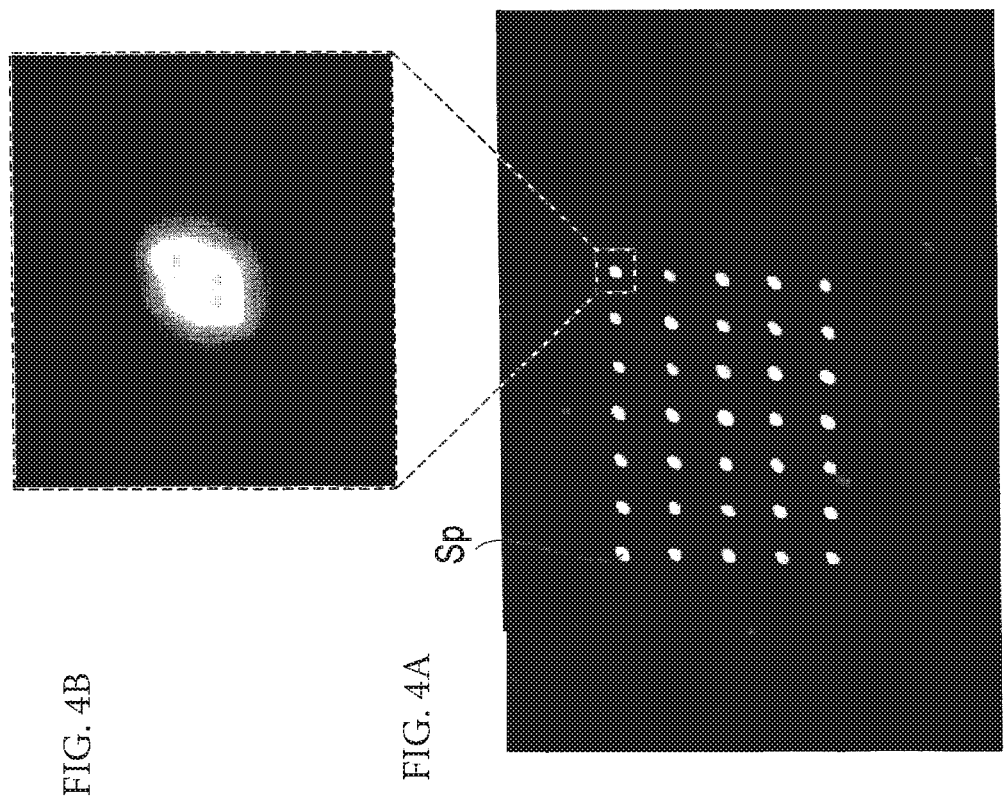

SELF-POSITION CALCULATING APPARATUS AND SELF-POSITION CALCULATING METHOD

TECHNICAL FIELD

The present invention relates to a self-position calculating apparatus and a self-position calculating method.

BACKGROUND

A technique has been known in which: cameras installed in a vehicle capture and obtain images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even if the vehicle moves slightly at slow-speed. To this end, a feature point is detected from each image, the position of the feature point is obtained, and then, the amount of movement of the vehicle is obtained from the direction and distance of movement (amount of movement) of the feature point.

In addition, a technique of performing a three-dimensional measurement using a laser light projector for projecting laser light in a grid pattern (patterned light beam) has been known (see Japanese Patent Application Publication No. 2007-278951). According to Japanese Patent Application Publication No. 2007-278951, an image of an area of the projected patterned light beam is captured with a camera; the patterned light beam is extracted from the captured image; and a behavior of the vehicle is obtained from the positions of the patterned light beam.

In a case where, however, using the technique described in Japanese Patent Application Publication No. 2008-175717 to detect the feature point on the road surface in the same area as the area of the projected patterned light beam described in Japanese Patent Application Publication No. 2007-278951, it is difficult to distinguish between the patterned light beam and the feature point. On the other hand, in a case of detecting the feature point on the road surface in an area away from the area of the projected patterned light beam is projected, an error in calculating an amount of movement of the feature point becomes larger.

SUMMARY

With the above problems taken into consideration, an object of the present invention is to provide a self-position calculating apparatus and a self-position calculating method which are capable of easily identifying feature points while distinguishing between the feature points and the patterned light beam, and thereby capable of accurately calculating the self-position of the vehicle.

A self-position calculating apparatus of a first aspect of the present invention projects a patterned light beam onto a road surface around a vehicle; captures and thus obtains an image of the road surface around the vehicle covering an area of the projected patterned light beam is projected; calculates an orientation angle of the vehicle relative to the road surface from a position of the patterned light beam on the obtained image; detects multiple feature points on the road surface from the obtained image; calculates an amount of change in the orientation of the vehicle based on temporal changes in the multiple detected feature points on the road surface; and calculates a current position and a current orientation angle of the vehicle by adding the amount of change in the orientation to an initial position and an initial orientation angle of the vehicle relative to the road surface. The projection of the patterned light beam is achieved by selectively projecting the patterned light beam onto a specific patterned light beam-projected region out of multiple patterned light beam-projected regions depending on how the feature points on the road surface are detected by a feature point detector.

BRIEF DESCRIPTION OF THE DRAWINGS

FIG. 3(a) is a diagram showing how a position of spotlighted areas on a road surface is calculated using the light projector and the camera;

FIG. 3(b) is a diagram showing how a direction of movement of the camera is obtained from temporal changes in a feature point which is detected outside an area of a patterned light beam projected;

FIG. 4 is a diagram showing an image of a patterned light beam which is obtained by applying a binarization process to an image obtained with the camera with FIG. 4(a) being a diagram showing the entirety of the patterned light beam, FIG. 4(b) being a magnified diagram showing one spotlight, and FIG. 4(c) being a diagram showing a position of the center of gravity of spotlights;

FIG. 14(*b*) is a graph showing a temporal change in the number of feature points detected from each patterned light beam-projected region;

FIG. 16(*b*) is a schematic diagram showing an example of a selected set of patterned light beam-projected regions;

FIG. 17(*b*) is a graph showing a temporal change in the number of feature points detected from each set of patterned light beam-projected regions;

FIG. 19(*b*) is a schematic diagram showing an example of a selected patterned light beam-projected region;

FIG. 21(*b*) is a schematic diagram showing an example of selected patterned light beam-projected regions;

FIG. 22(*b*) is a graph showing how a result of determining whether or not a feature point exists at a position of each spotlight changes over time;

FIG. 24(*b*) is a schematic diagram showing an example of selected patterned light beam-projected regions;

FIG. 25(*b*) is a graph showing how a result of estimating whether or not a feature point exists at a position of each spotlight changes over time;

FIG. 28(*b*) is a schematic diagram showing an example of selected patterned light beam-projected regions;

FIG. 29(*b*) is a graph showing how a result of determining whether or not there exist feature points in each feature-points increase/decrease prediction area changes over time.

DETAILED DESCRIPTION OF THE EMBODIMENTS

Figure 1:
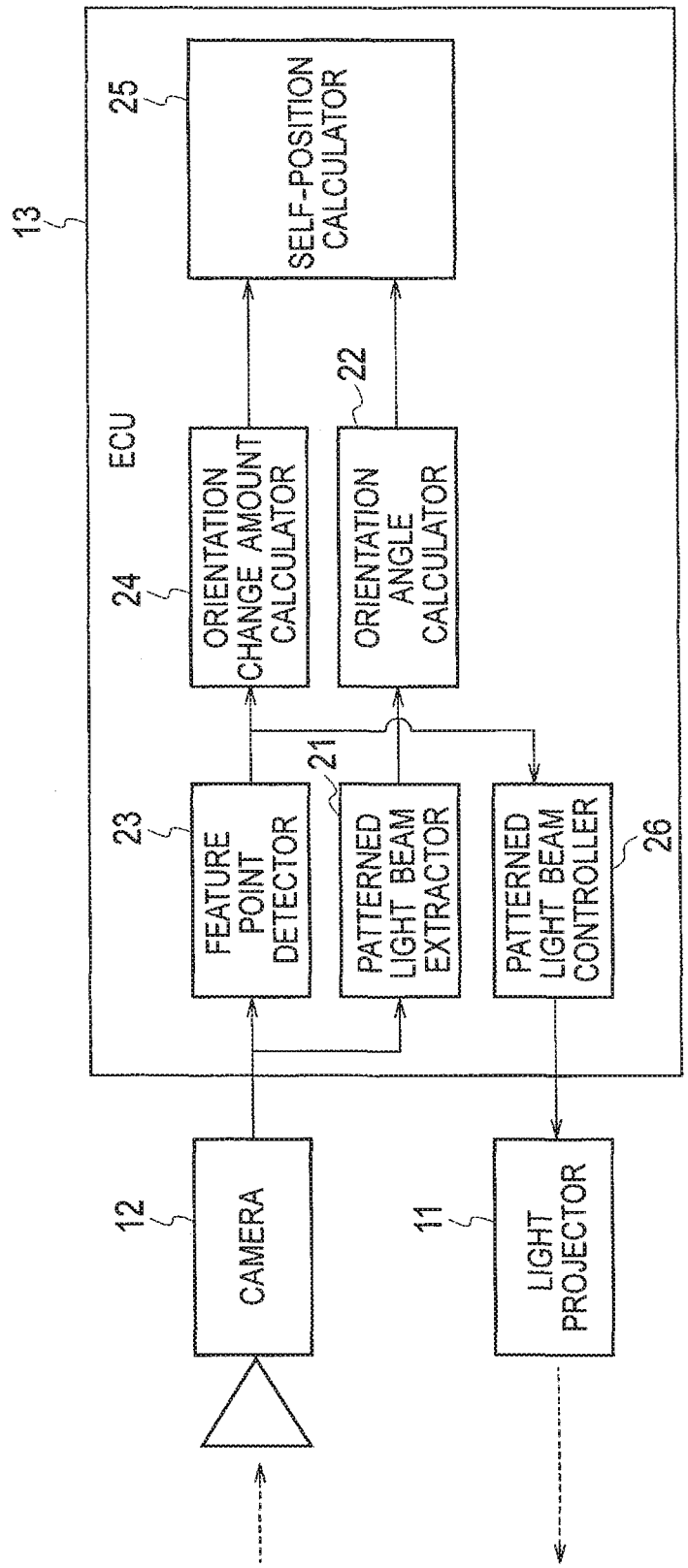
FIG. 1 is a block diagram showing an overall configuration of a self-position calculating apparatus of a first embodiment.

Referring to the drawings, descriptions will be hereinbelow provided for first and second embodiments to which the present invention is applied.

[First Embodiment]

[Hardware Configuration]

To begin with, referring to FIG. 1, descriptions will be provided for a hardware configuration of a self-position calculating apparatus of a first embodiment. The self-position calculating apparatus includes a light projector 11, a camera 12 and an engine control unit (ECU) 13. The light projector 11 is installed in a vehicle, and projects a patterned light beam onto a road surface around the vehicle. The camera 12 is installed in the vehicle, and is an example of an image capturing unit configured to capture and thus obtain images of the road surface around the vehicle, inclusive of an area of the patterned light beam projected. The ECU 13 is an example of a controller configured to control the light projector 11, and to perform a series of information process cycles for calculating the self-position of the vehicle from images obtained with the camera 12.

Figure 2:
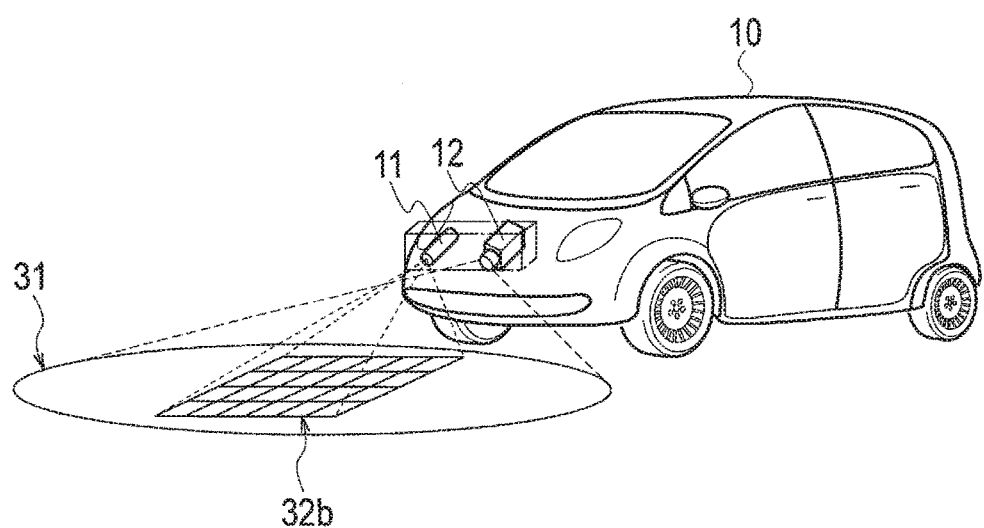
FIG. 2 is an external view showing an example of how a light projector and a camera are installed in a vehicle.

The camera 12 is a digital camera using a solid-state image sensor such as a CCD and a CMOS, and obtains processable digital images. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example. The height at and direction in which to set the camera 12 are adjusted in a way that enables the camera 12 to capture images of feature points (textures) on the road surface 31 in front of the vehicle 10 and the patterned light beam 32*b* projected from the light projector 11. The focus and diaphragm of the lens of the camera 12 are automatically adjusted as well. The camera 12 repeatedly captures images at predetermined time intervals, and thereby obtains a series of image (frame) groups. Each time the camera 12 captures an image, image data obtained with the camera 12 is transferred to the ECU 13, and is stored in a memory included in the ECU 13.

As shown in FIG. 2, the light projector 11 projects the patterned light beam 32*b* having a predetermined shape, inclusive of a square or rectangular lattice shape, onto the road surface 31 within an image capturing range of the camera 12. The camera 12 captures images of the patterned light beam projected onto the road surface 31. The light projector 11 includes a laser pointer and a diffraction grating, for example. The diffraction grating diffracts the laser beam projected from the pointer. Thereby, as shown in FIGS. 2 to 4, the light projector 11 generates the patterned light beam (32*b*, 32*a*) which includes multiple spotlights arranged in a lattice or matrix pattern. In examples shown in FIGS. 3 and 4, the light projector 11 generates the patterned light beam 32*a* including 5×7 spotlights.

Returning to FIG. 1, the ECU 13 includes a CPU, a memory, and a microcontroller including an input-output section. By executing pre-installed computer programs, the ECU 13 forms multiple information processors which function as the self-position calculating apparatus. For each image (frame), the ECU 13 repeatedly performs the series of information process cycles for calculating the self-position of the vehicle from images obtained with the camera 12. Incidentally, the ECU 13 may be also used as an ECU for controlling other systems of the vehicle 10.

In this respect, the multiple information processors include a patterned light beam extractor 21, an orientation angle calculator 22, a feature point detector 23, an orientation change amount calculator 24, a self-position calculator 25, and a patterned light beam controller 26.

The patterned light beam extractor 21 reads an image obtained with the camera 12 from the memory, and extracts the position of the patterned light beam from this image. For example, as shown in FIG. 3(a), the light projector 11 projects the patterned light beam 32a, which includes the multiple spotlights arranged in a matrix pattern, onto the road surface 31, while the camera 12 detects the patterned light beam 32a reflected off the road surface 31. The patterned light beam extractor 21 applies a binarization process to the image obtained with the camera 12, and thereby extracts only an image of the spotlights Sp, as shown in FIGS. 4(a) and 4(b). Thereafter, as shown in FIG. 4(c), the patterned light beam extractor 21 extracts the position of the patterned light beam 32a by calculating the center-of-gravity position He of each spotlight Sp, that is to say, the coordinates (Uj, Vj) of each spotlight Sp on the image. The coordinates are expressed using the number assigned to a corresponding pixel in the image sensor of the camera 12. In a case where the patterned light beam includes 5×7 spotlights Sp, "j" is an integer not less than 1 but not greater than 35. The memory stores the coordinates (Uj, Vj) of the spotlight Sp on the image as data on the position of the patterned light beam 32a.

The orientation angle calculator 22 reads the data on the position of the patterned light beam 32a from the memory, and calculates the distance and orientation angle of the vehicle 10 relative to the road surface 31 from the position of the patterned light beam 32a on the image obtained with the camera 12. For example, as shown in FIG. 3(a), using the trigonometrical measurement principle, the orientation angle calculator 22 calculates the position of each spotlighted area on the road surface 31, as the position of the spotlighted area relative to the camera 12, from a base length Lb between the light projector 11 and the camera 12, as well as the coordinates (Uj, Vj) of each spotlight on the image. Thereafter, the orientation angle calculator 22 calculates a plane equation of the road surface 31 onto which the patterned light beam 32a is projected, that is to say, the distance and orientation angle (normal vector) of the camera 12 relative to the road surface 31, from the position of each spotlight relative to the camera 12.

It should be noted that in the embodiment, the distance and orientation angle of the camera 12 relative to the road surface 31 are calculated as an example of the distance and orientation angle of the vehicle 10 relative to the road surface 31 since the position of installation of the camera 12 in the vehicle 10 and the angle for the camera 12 to capture images are already known. In other words, the distance between the road surface 31 and the vehicle 10, as well as the orientation angle of the vehicle 10 relative to the road surface 31 can be obtained by calculating the distance and orientation angle of the camera 12 relative to the road surface 31.

To put it specifically, since the camera 12 and the light projector 11 are fixed to the vehicle 10, the direction in which to project the patterned light beam 32a and the distance (the base length Lb) between the camera 12 and the light projector 11 are already known. For this reason, using the trigonometrical measurement principle, the orientation angle calculator 22 is capable of obtaining the position of each spotlighted area on the road surface 31, as the position (Xj, Yj, Zj) of each spotlight relative to the camera 12, from the coordinates (Uj, Vj) of each spotlight on the image. Hereinafter, the distance and orientation angle of the camera 12 relative to the road surface 31 will be abbreviated as "distance and orientation angle." The distance and orientation angle calculated by the orientation angle calculator 22 are stored into the memory.

It should be noted that the descriptions are provided for the embodiment in which the distance and orientation angle are calculated in each information process cycle.

Furthermore, in many cases, the position (Xj, Yj, Zj) of each spotlight relative to the camera 12 is not present on the same plane. This is because the relative position of each spotlight changes according to the unevenness of the asphalt of the road surface 31. For this reason, the method of least squares may be used to obtain a plane equation which minimizes the sum of squares of distance difference of each spotlight. Data on the thus-calculated distance and orientation angle is used by the self-position calculator 25 shown in FIG. 1.

The feature point detector 23 reads the image obtained with the camera 12 from the memory, and detects feature points on the road surface 31 from the image read from the memory. In order to detect the feature points on the road surface 31, the feature point detector 23 may use a method described in "D. G. Lowe, "Distinctive Image Features from Scale-Invariant Keypoints," Int. J. Comput. Vis., vol. 60, no. 2, pp. 91-110, November 200." Otherwise, the feature point detector 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
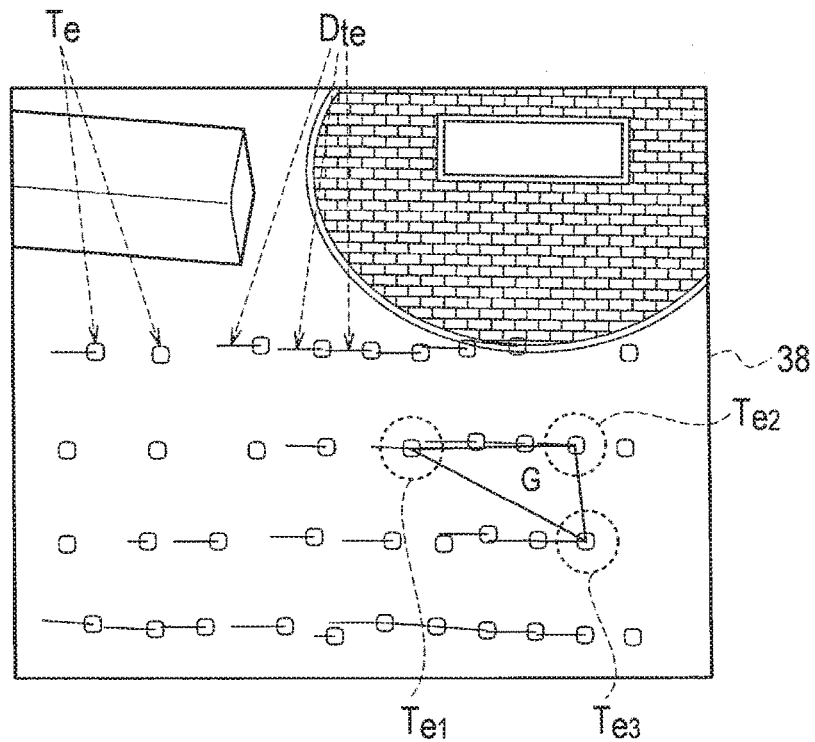
FIG. 6 is a diagram showing feature points detected on the image with FIG. 6(a) being a diagram showing a first frame (image) obtained at time t and FIG. 6(b) being a diagram showing a second frame obtained at time t+Δt.
Figure 6B:
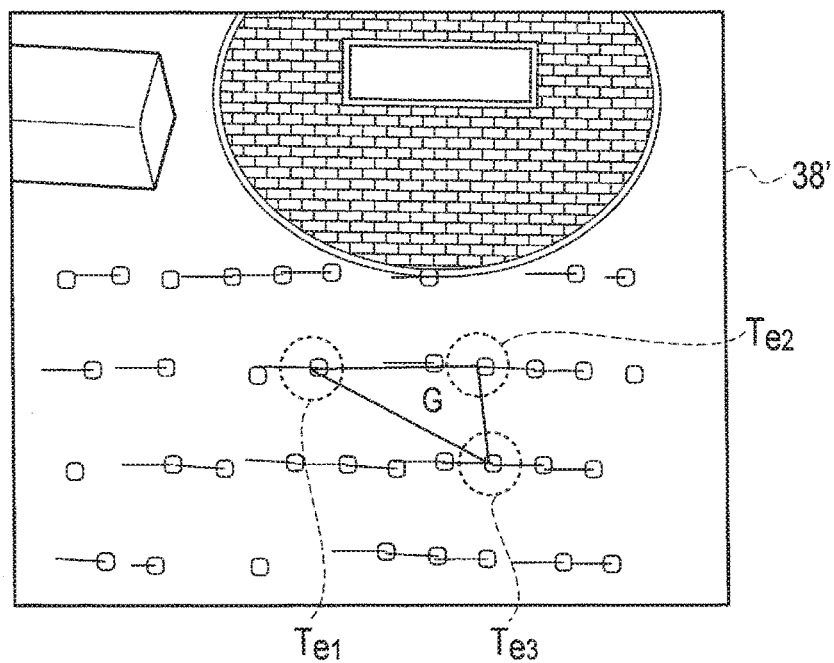

To put it specifically, for example, the feature point detector 23 uses the Harris operator or the SUSAN operator as that points, such as apexes of an object, the luminance values of which are largely different from those of the vicinities of the points are detected as the feature points. Instead, however, the feature point detector 23 may use a SIFT (Scale-Invariant Feature Transform) feature amount so that points around which the luminance values change with certain regularity are detected as the feature points. After detecting the feature points, the feature point detector 23 counts the total number N of feature points detected from one image, and assigns identification numbers (i (1≤i≤N)) to the respective feature points. The position (Ui, Vi) of each feature point on the image are stored in the memory inside the ECU 13. FIGS. 6(a) and 6(b) each shows examples of the feature points Te which are detected from the image captured with the camera 12. Furthermore, in FIGS. 6(a) and 6(b), directions of changes of, and amounts of changes in, the feature points Te are expressed with vectors Dte, respectively.

It should be noted that the present embodiment treats particles of asphalt mixture with a particle size of not less than 1 cm but not greater than 2 cm as the feature points on the road surface 31. The camera 12 employs the VGA resolution mode (approximate 300 thousand pixels) in order to detect the feature points. In addition, the distance from the camera 12 to the road surface 31 is approximately 70 cm. Moreover, the direction in which the camera 12 captures images is tilted at approximately 45 degrees to the road surface 31 from the horizontal plane. What is more, the luminance value of each image captured with the camera 12 and thereafter sent to the ECU 13 is within a range of 0 to 255 (0: darkest, 255: brightest).

The orientation change amount calculator 24 reads, from the memory, the positional coordinates (Ui, Vi) of each of the multiple feature points on an image included in a previous image frame (at time t) which is among the image flames captured at each certain information process cycle. Furthermore, the orientation change amount calculator 24 reads, from the memory, the positional coordinates (Ui, Vi) of each of the multiple feature points on the image included in the current frame (at time t+Δt). Thereafter, based on the temporal changes in the positions of the multiple feature points, the orientation change amount calculator 24 obtains an amount of change in the orientation of the vehicle. In this respect, the amount of change in the orientation of the vehicle includes both "amounts of changes in the distance and orientation angle" of the vehicle relative to the road surface and an "amount of movement of the vehicle" on the road surface. Descriptions will be hereinbelow provided for how to calculate the "amounts of changes in the distance and orientation angle" and the "amount of movement of the vehicle".

Figure 5:
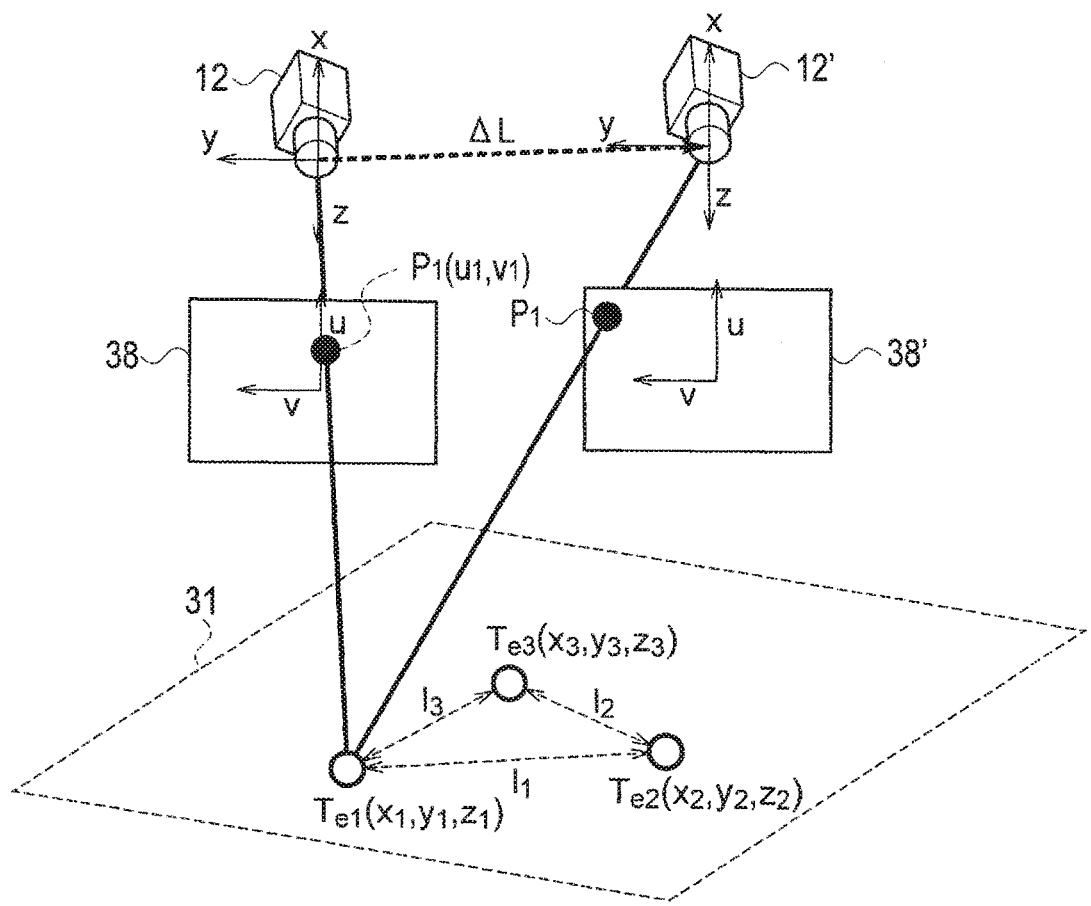
FIG. 5 is a schematic diagram for describing a method of calculating amounts of changes in a distance and orientation angle.

The amounts of changes in the distance and orientation angle can be obtained as follows, for example. FIG. 6(a) shows an example of a first frame (image) 38 (in FIG. 5) captured at time t. Let us assume a case where as shown in FIGS. 5 and 6(a), a relative position (Xi, Yi, Zi) of each of three feature points Te1, Te2, Te3 are calculated on the first frame 38, for example. In this case, a plane G (see FIG. 6(a)) identified by the feature points Te1, Te2, Te3 can be regarded as the road surface. Accordingly, the orientation change amount calculator 24 is capable of obtaining the distance and orientation angle (normal vector) of the camera 12 relative to the road surface (the plane G), from the relative position (Xi, Yi, Zi) of each of the feature points. Furthermore, from an already-known camera model, the orientation change amount calculator 24 is capable of obtaining a distance 11 between the feature points Te1, Te2, a distance 12 between the feature points Te2, Te3 and a distance 13 between the feature points Te3, Te1, as well as an angle between a straight line joining the feature points Te1, Te2 and a straight line joining the feature points Te2, Te3, an angle between the straight line joining the feature points Te2, Te3 and a straight line joining the feature points Te3, Te1, and an angle between the straight line joining the feature points Te3, Te1 and the straight line joining the feature points Te1, Te2. The camera 12 in FIG. 5 shows where the camera is located when camera captures the first frame.

It should be noted that in FIG. 5, the three-dimensional coordinates (Xi, Yi, Zi) of the relative position of each feature point relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame 38' obtained at time (t+Δt) where the time length Δt passed from time t. A camera 12' in FIG. 5 shows where the camera is located when camera captures the second frame 38'. As shown in FIGS. 5 and 6(b), the camera 12' captures an image including the feature points Te1, Te2, Te3 as the second frame 38', and the feature point detector 23 detects the feature points Te1, Te2, Te3 from the image. In this case, the orientation change amount calculator 24 is capable of calculating an amount ΔL of movement of the camera 12 in the interval of time Δt from: the relative position (Xi, Yi, Zi) of each of the feature points Te1, Te2, Te3 at time t; a position P1(Ui, Vi) of each feature point on the second frame 38'; and the camera model of the camera 12. Accordingly, the orientation change amount calculator 24 is capable of calculating the amount of movement of the vehicle. Furthermore, the orientation change amount calculator 24 is capable of calculating the amounts of changes in the distance and orientation angle as well. For example, the orientation change amount calculator 24 is capable of calculating the amount (ΔL) of movement of the camera 12 (the vehicle) and the amounts of changes in the distance and orientation angle of the camera 12 (the vehicle) by solving the following system of simultaneous equations (1) to (4). Incidentally, the equation (1) mentioned below is based on an ideal pinhole camera free from strain and optical axial misalignment which is modeled after the camera 12, where $\lambda i$ and f denote a constant and a focal length. The parameters of the camera model may be calibrated in advance.

[Equation (1)]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation (2)]

$$(x_1 - x_2)^2 + (y_1 - y_2)^2 + (z_1 - z_2)^2 = l_1^2 \quad (2)$$

[Equation (3)]

$$(x_3 - x_2)^2 + (y_3 - y_2)^2 + (z_3 - z_2)^2 = l_2^2 \quad (3)$$

[Equation (4)]

$$(x_1 - x_3)^2 + (y_1 - y_3)^2 + (z_1 - z_3)^2 = l_3^2 \quad (4)$$

It should be noted that instead of using all the feature points whose relative positions are calculated in the images detected at time t and time t+Δt, the orientation change amount calculator 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

If like in this case, the feature points Te1, Te2, Te3, the relative positions of which on the frame image 38 at time t are calculated, are detected by the feature point detector 23 from the frame image 38' at time t+Δt as well, the orientation change amount calculator 24 is capable of calculating the "amount of change in the orientation angle of the vehicle" from the temporal changes in the relative positions (Xi, Yi, Zi) of the respective feature points on the road surface and the temporal changes of the positions (Ui, Vi) of the respective feature points on the image. Furthermore, the orientation change amount calculator 24 is capable of calculating the amount of movement of the vehicle.

To put it specifically, if three or more feature points each corresponding between the previous and current frames can be detected continuously from the two frames, the continuation of the process (integration operation) of adding the amounts of changes in the distance and orientation angle makes it possible to continuously update the distance and orientation angle without using the patterned light beam 32a. Nevertheless, the distance and orientation angle calculated using the patterned light beam 32a, or a predetermined initial position and orientation angle, may be used for the first information process cycle. In other words, the distance and orientation angle which are starting points of the integration operation may be calculated using the patterned light beam 32a, or may be set at predetermined initial values. It is desirable that the predetermined initial position and the predetermined initial orientation angle are a distance and an orientation angle determined with at least the occupants and payload of the vehicle 10 taken into consideration. For example, the distance and orientation angle calculated using the patterned light beam 32a which is projected while the ignition switch of the vehicle 10 is on and when the shift position is moved from the parking position to another position may be used as the predetermined initial position and the predetermined initial orientation angle. Thereby, it is possible to obtain the distance and orientation angle which is not affected by the roll or pitch of the vehicle 10 due to a turn, acceleration or deceleration of the vehicle 10.

It should be noted that the associating of the feature points in the current frame with the feature points in the previous frame may be achieved, for example, by: storing an image of a small area around each detected feature point into the memory; and for each feature point, making a determination from a similarity in luminance information and a similarity in color information. To put it specifically, the ECU 13 stores a 5 (horizontal)×5 (vertical)-pixel image around each detected feature point into the memory. If for example, the difference in the luminance information among 20 or more pixels is equal to or less than 1%, the orientation change amount calculator 24 determines that the feature points in question correspond between the current and previous frames. Thereafter, the amount of change in the orientation obtained through the foregoing process is used by the self-position calculator 25 in the next process step to calculate the self-position of the vehicle 10.

The self-position calculator 25 calculates the current distance and orientation angle of the vehicle 10 from the "amounts of changes in the distance and orientation angle" calculated by the orientation change amount calculator 24. In addition, the self-position calculator 25 calculates the self-position of the vehicle 10 from the "amount of movement of the vehicle" calculated by the orientation change amount calculator 24.

Descriptions will be provided for how to perform the foregoing calculations in a specific case where the distance and orientation angle calculated by the orientation angle calculator 22 (that is to say, the distance and orientation angle calculated using the patterned light beam) are set as the starting points of the calculations. In this case, the self-position calculator 25 updates the distance and orientation angle with the most recent numerical values by sequentially adding (performing an integration operation on) the amounts of changes in the distance and orientation angle calculated for each frame by the orientation change amount calculator 24 to the starting points, that is to say, the distance and orientation angle calculated by the orientation angle calculator 22. In addition, the self-position calculator 25 calculates the self-position of the vehicle by: setting the position of the vehicle, which is obtained when the orientation angle calculator 22 calculates the distance and orientation angle, as the starting point (the initial position of the vehicle); and by sequentially adding (performing an integration operation on) the amount of movement of the vehicle to the initial position of the vehicle. For example, by setting the starting point (the initial position of the vehicle) which matches the position of the vehicle on a map, the self-position calculator 25 is capable of sequentially calculating the current self-position of the vehicle on the map.

Thereby, the orientation change amount calculator 24 is capable of calculating the self-position of the vehicle by obtaining the amount ($\Delta L$) of movement of the camera 12 for the time length $\Delta t$. In addition, the orientation change amount calculator 24 is capable of calculating the amounts of changes in the distance and orientation angle at the same time. For these reasons, with the amounts of changes in the distance and orientation angle of the vehicle taken into consideration, the orientation change amount calculator 24 is capable of accurately calculating the amount ($\Delta L$) of movement in six degrees of freedom (forward/rearward moving, leftward/rightward moving, upward/downward moving, yawing, pitching and rolling). In other words, an error in estimating the amount ($\Delta L$) of movement can be minimized even if the distance and orientation angle are changed by the roll or pitch due to the turn, acceleration or deceleration of the vehicle 10.

In the present embodiment, the amount ($\Delta L$) of movement of the camera 12 is calculated by: calculating the amounts of changes in the distance and orientation angle; and updating the distance and orientation angle. Instead, however, the amount ($\Delta L$) of movement of the camera 12 may be calculated by: calculating the amount of change in only the orientation angle of the camera 12 relative to the road surface 31; and updating only the orientation angle of the camera 12. In this case, it may be supposed that the distance between the road surface 31 and the camera 12 remains constant. This makes it possible to reduce the operation load on the ECU 13 while minimizing the error in estimating the amount ($\Delta L$) of movement with the amount of change in the orientation angle taken into consideration, and to increase the operation speed of the ECU 13.

The patterned light beam controller 26 controls the projection of the patterned light beam 32a by the light projector 11. For example, after the ignition switch of the vehicle 10 is turned on, once the self-position calculating apparatus becomes activated, the patterned light beam controller 26 starts to project the patterned light beam 32a. Thereafter, until the self-position calculating apparatus stops its operation, the patterned light beam controller 26 continues projecting the patterned light beam 32a. Otherwise, the patterned light beam controller 26 may alternately turn on and off the light projection in predetermined intervals.

Figure 7A:
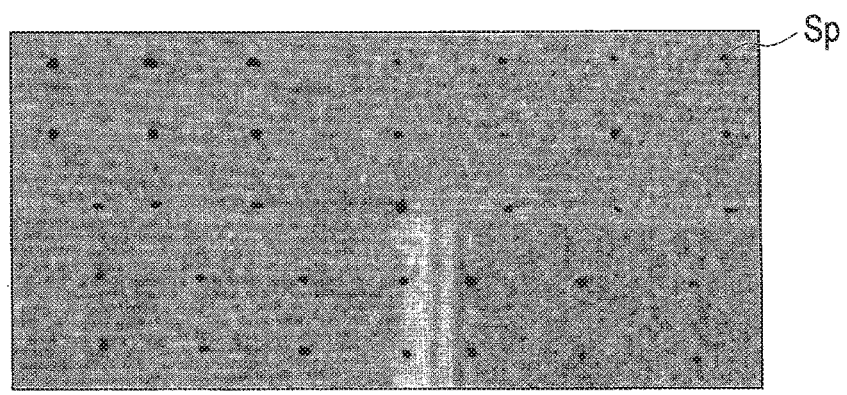
FIG. 7(a) is a diagram showing an image obtained by the camera.
Figure 7B:
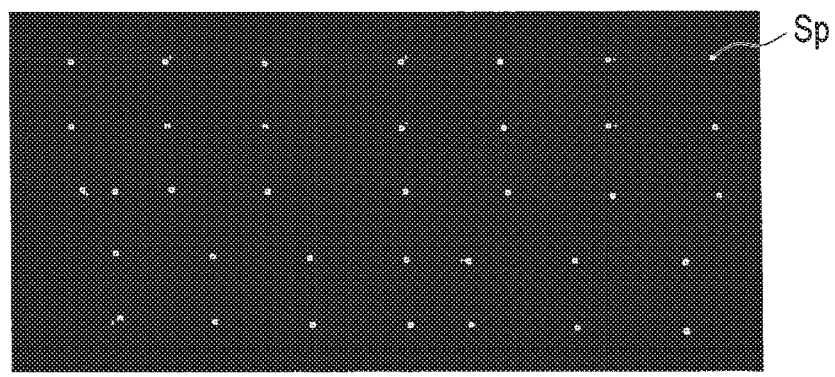
FIG. 7(b) is a diagram showing an image of the patterned light beam which is obtained by applying a binarization process to the image obtained by the camera.
Figure 7C:
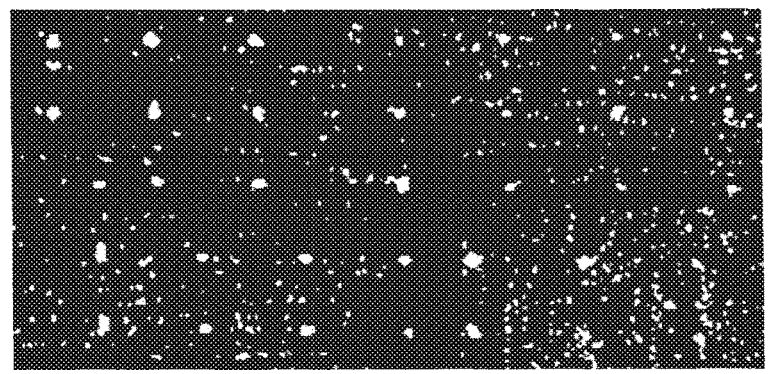
FIG. 7(c) is a diagram showing a result of detecting feature points.

In the case where the patterned light beam 32a including 5×7 spotlights SP is projected, an image as shown in FIG. 7(a) is obtained by the camera 12. Applying the binarization process to the image, the patterned light beam extractor 21 can extract the patterned light beam (spotlights) Sp as shown in FIG. 7(b). Meanwhile, the feature point detector 23 has difficulty in detecting feature points on the road surface 31 from the same area as an area of the projected patterned light beam Sp, because as shown in FIG. 7(c), it is difficult to identify the feature points on the road surface 31 against the patterned light beam Sp. In contrast to this, when feature points on the road surface 31 are detected by the feature point detector 23 from an area away from the area of the patterned light beam 32a projected, errors in calculating amounts of movements of the feature points become larger.

With this taken into consideration, the embodiment is configured such that depending on how the feature points on the road surface are detected by the feature point detector 23, the patterned light beam controller 26 selectively projects the patterned light beam onto a specific one of multiple patterned light beam-projected regions.

Figure 8:
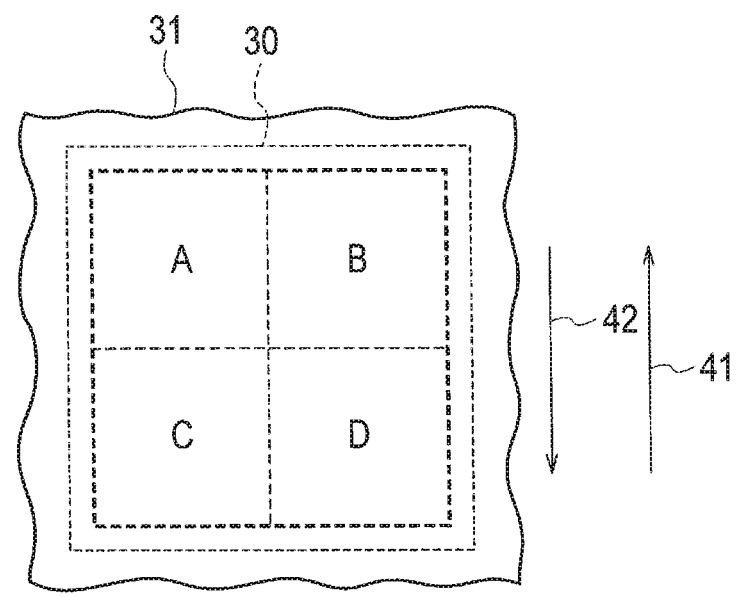
FIG. 8 is a schematic diagram showing an example of patterned light beam-projected regions divided in vertical and left-right directions.

For example, as shown in FIG. 8, the patterned light beam controller 26 sets the multiple (four) patterned light beam-projected regions A to D within an image capturing area 30. In FIG. 8, an arrow 41 denotes a movement direction of the vehicle, while an arrow 42 pointed in a direction opposite to that of the arrow 41 denotes a movement direction of the feature points. The patterned light beam-projected regions A to D are four parts into which the image capturing area 30 is divided in the movement direction 41 of the vehicle (in a vertical direction) and in a vehicle-width direction orthogonal to the movement direction 41 of the vehicle (in a left-right direction), and are arranged in a rectangular pattern. Incidentally, the number of patterned light beam-projected regions is plural, and no other restriction is imposed in the number of regions. Two or three patterned light beam-projected regions may be set therein. Otherwise, five or more patterned light beam-projected regions may be set therein.

Figure 9A:
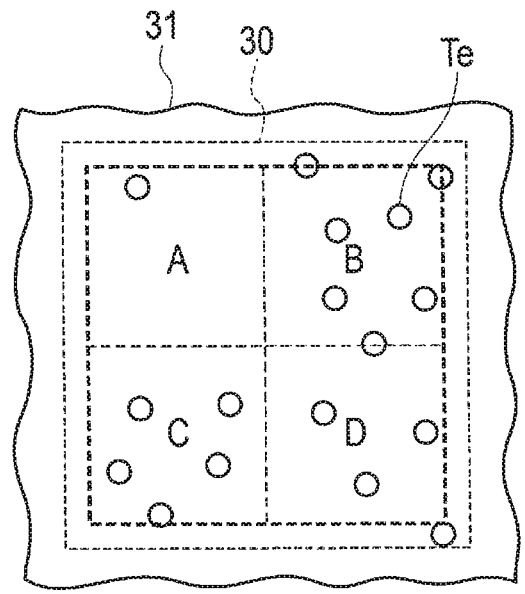
FIG. 9(a) is a schematic diagram showing an example of detected feature points.

Suppose a case where as shown in FIG. 9(a), the feature points Te are detected by the feature point detector 23. For each of the patterned light beam-projected regions A to D, the patterned light beam controller 26 counts the number of feature points Te detected therein. Meanwhile, for each of the patterned light beam-projected regions A to D, the patterned light beam controller 26 may count the number of feature points falling within the region. Otherwise, for each of the patterned light beam-projected regions A to D, the patterned light beam controller 26 may count the number of detected feature points by including: feature points falling within the region; and feature points Te lying on the boundaries of the region with their parts belonging to the region.

Figure 9B:
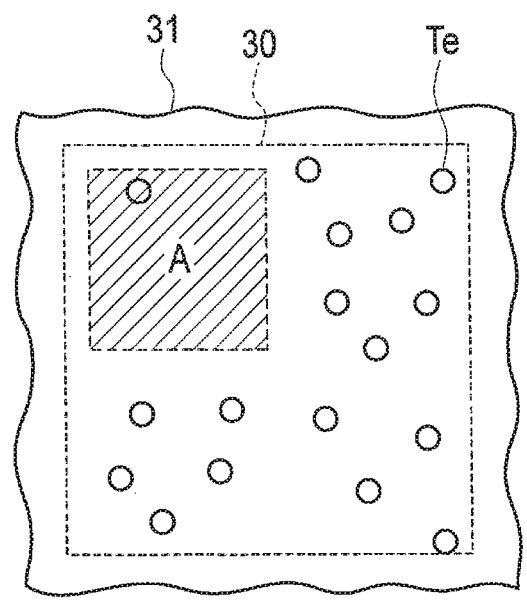
FIG. 9(b) is a schematic diagram showing an example of a selected patterned light beam-projected region.

In the case shown in FIG. 9(a), the counted number of feature points detected as falling within the patterned light beam-projected region A is one; the region B, four; the region C, four; and the region D, three. The patterned light beam controller 26 causes the light beam to be selectively projected onto the patterned light beam-projected region A where the number of feature points is the smallest among the patterned light beam-projected regions A to D, as shown in FIG. 9(b).

Figure 10A:
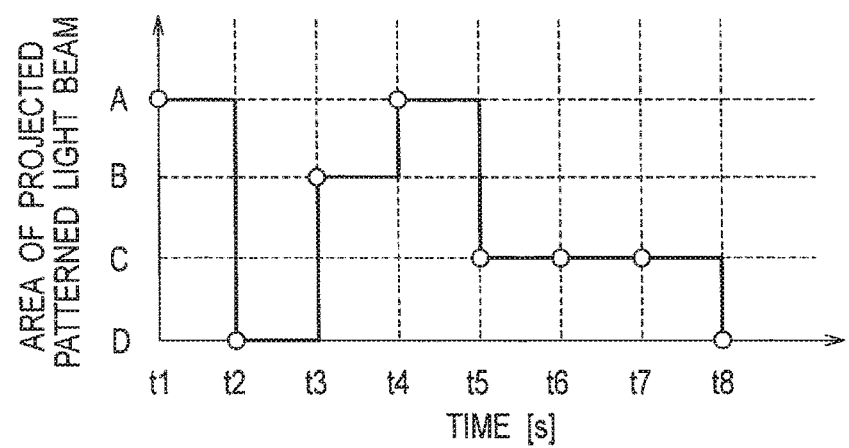
FIG. 10(a) is a graph showing how the selected patterned light beam-projected region changes from one to another over time.
Figure 10B:
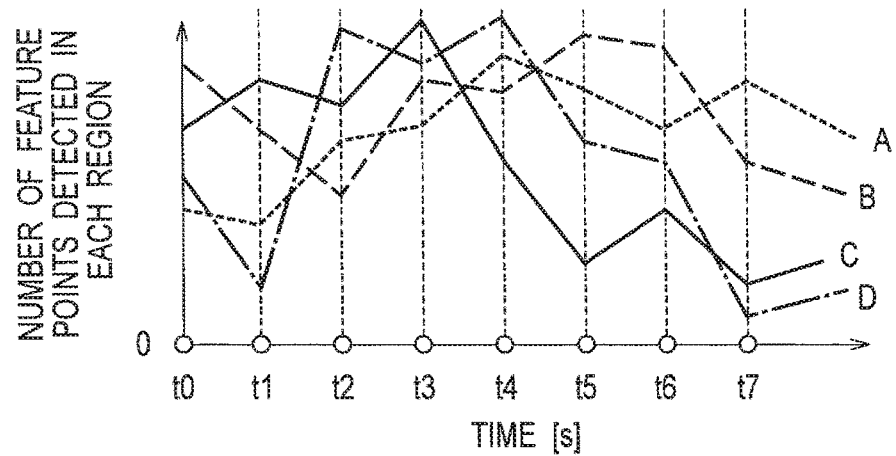
FIG. 10(b) is a graph showing a temporal change in the number of feature points detected from each patterned light beam-projected region.

FIG. 10(a) shows how a selected patterned light beam-projected region changes from one to another over time. For each of the patterned light beam-projected regions A to D, FIG. 10(b) shows a temporal change in the number of feature points detected therein. Times t0 to t7 represent times at which the corresponding information process cycles are performed. At time t0, when the patterned light beam controller 26 counts the number of feature points Te detected by the feature point detector 23, the number of detected feature points is the smallest in the patterned light beam-projected region A, as shown in FIG. 10(b). Thus, as shown in FIG. 10(a), at time t1 of the next information process cycle, the patterned light beam controller 26 causes the light beam to be selectively projected onto the patterned light beam-projected region A where the number of feature points is the smallest at time t0 of the previous information process cycle.

Similarly, at times t1 to t6, the patterned light beam controller 26 counts the number of feature points. Thus, at time t2 to t7 of the corresponding next information process cycles, the patterned light beam controller 26 causes the light beam to be selectively projected onto a patterned light beam-projected region where the number of feature points is the smallest at time t1 to t6 of the previous information process cycles.

[Information Process Cycle]

Figure 11:
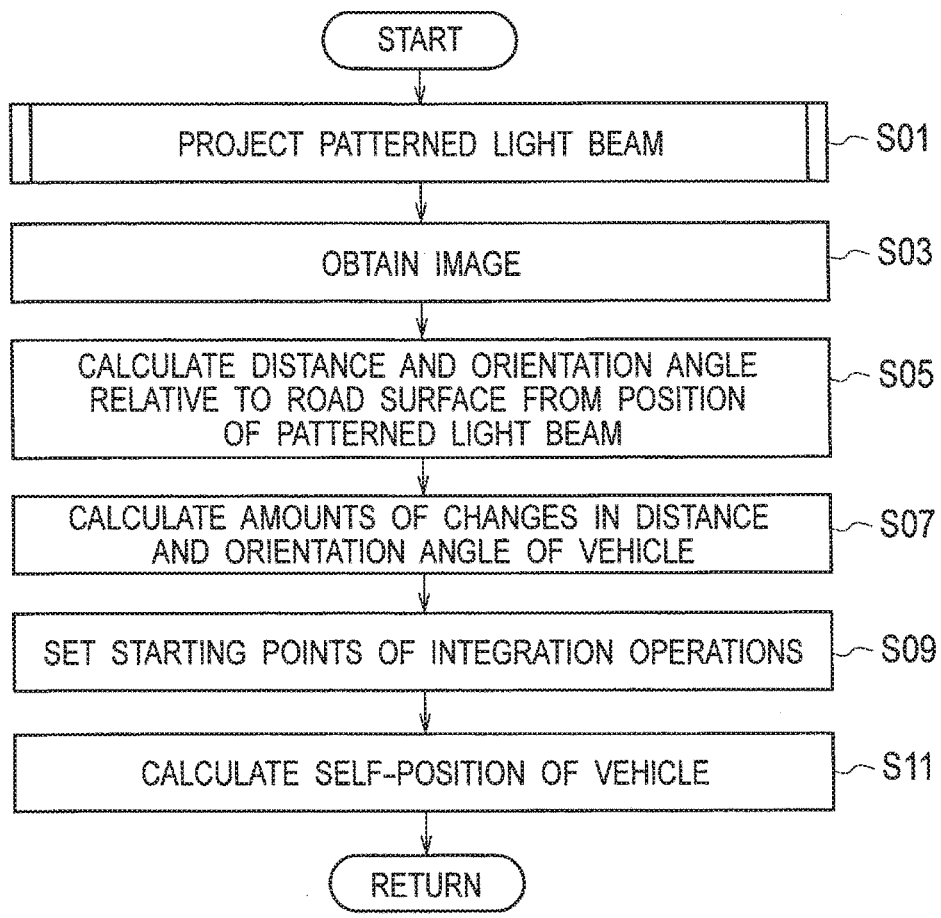
FIG. 11 is a flowchart for explaining an example of a self-position calculating method of the first embodiment.

Next, referring to FIG. 11, descriptions will be provided for the information process cycle to be repeatedly performed by the ECU 13. The information process cycle is an example of a self-position calculating method of calculating the self-position of the vehicle 10 from the image 38 obtained with the camera 12.

The information process cycle shown in a flowchart of FIG. 11 is started at the same time as the self-position calculating apparatus becomes activated after the ignition switch of the vehicle 10 is turned on, and is repeatedly performed until the self-position calculating apparatus stops its operation.

In step S01 in FIG. 11, the patterned light beam controller 26 controls the light projector 11 to make the light projector 11 to project the patterned light beam 32a onto the road surface 31. Using the flowchart in FIG. 11, descriptions will be provided for a case where the patterned light beam 32a is continuously projected. Note that details of step S01 will be described later.

Proceeding to step S03, the ECU 13 controls the camera 12 to obtain the image 38 by making the camera 12 shoot the road surface 31 around the vehicle 10, inclusive of an area of the projected patterned light beam 32a. The ECU 13 stores the data on the image obtained with the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the next image becomes equal to a median value between the maximum and minimum values in accordance with of an average of the brightness of the image 38 obtained in the previous information process cycle. Otherwise, since the value of the brightness of the area of the projected patterned light beam 32a, the ECU 13 may obtain an average value of the brightness of the previously-obtained image 38 from an area outside a part from which the patterned light beam 32a is extracted.

Proceeding to step S05, to begin with, the patterned light beam extractor 21 reads the image 38 obtained with the camera 12 from the memory, and extracts the position of the patterned light beam 32a from the image 38, as shown in FIG. 4(c). The patterned light beam extractor 21 stores the coordinates (Uj, Vj) of each spotlight Sp on the image, which are calculated as the data on the position of the patterned light beam 32a, into the memory.

Furthermore, in step S05, the orientation angle calculator 22 reads the data on the position of the patterned light beam 32a from the memory, calculates the distance and orientation angle of the vehicle 10 relative to the road surface 31 from the position of the patterned light beam 32a, and stores the thus-calculated distance and orientation angle into the memory.

Proceeding to step S07, the ECU 13 detects the feature points Te from the image 38, extracts the feature points Te each corresponding between the previous and current information process cycles from the detected feature points Te, and calculates the amounts of changes in the distance and orientation angle from the positions (Ui, Vi) of the respective extracted feature points Te on the image. In addition, the ECU 13 calculates the amount of movement of the vehicle.

To put it specifically, to begin with, the feature point detector 23 reads the image 38 of the image capturing area 30 corresponding to FIG. 8, which is obtained with the camera 12, from the memory, detects the feature points Te on the road surface 31 from the image 38, and stores the positions (Ui, Vi) of the respective feature points Te on the image into the memory.

The orientation change amount calculator 24 reads the positions (Ui, Vi) of the respective feature points Te on the image from the memory, and calculates the positions (Xi, Yi, Zi) of the respective feature points Te relative to the camera 12 from the distance and orientation angle, as well as the positions (Ui, Vi) of the respective feature points Te on the image, which are calculated by the orientation angle calculator 22. Incidentally, the orientation change amount calculator 24 uses the distance and orientation angle which are set in step S09 in the previous information process cycle. Thereafter, the orientation change amount calculator 24 stores the positions (Xi, Yi, Zi) of the respective feature points Te relative to the camera 12 into the memory.

After that, the orientation change amount calculator 24 reads the positions (Ui, Vi) of the respective feature points Te on the image, and the relative positions (Xi, Yi, Zi) of the respective feature points Te calculated in step S07 in the previous information process cycle from the memory. The orientation change amount calculator 24 calculates the amounts of changes in the distance and orientation angle using: the relative positions (Xi, Yi, Zi) of the respective feature points Te each corresponding between the previous and current information process cycles; and the positions (Ui, Vi) of the respective thus-corresponding feature points Te on the image. Furthermore, the orientation change amount calculator 24 calculates the amount of movement of the vehicle from the previous relative positions (Xi, Yi, Zi) of the respective feature points Te and the current relative positions (Xi, Yi, Zi) of the respective feature points Te, and stores the resultant amount of movement of the vehicle into the memory. The "amounts of changes in the distance and orientation angle" and the "amount of movement of the vehicle" which are calculated in step S07, are used for the process in step S11.

Proceeding to step S09, where in the first information process cycle, the ECU 13 sets the starting points of the integration operations for calculating the self-position by use of the distance and orientation angle calculated using the patterned light beam 32a, or by use of the predetermined initial position and the predetermined initial orientation angle. In the subsequent information process cycles, if three or more feature points associated between the previous and current frames can be continuously detected, the continuation of the processes (integration processes) of adding the amounts of changes in the distance and orientation angle makes it possible to continuously update the distance and orientation angle without using the patterned light beam 32a.

Proceeding to step S11, the self-position calculator 25 calculates the self-position of the vehicle 10 from: the starting points of the integration operation set in step S09; and the amounts of changes in the distance and orientation angle of the vehicle 10 calculated in the process in step S07.

Thus, the self-position calculating apparatus of the embodiment is capable of calculating the self-position of the vehicle 10 by repeatedly performing the foregoing series of information process cycles to integrating the amount of movement of the vehicle 10.

[Process in Step S01]

Figure 12:
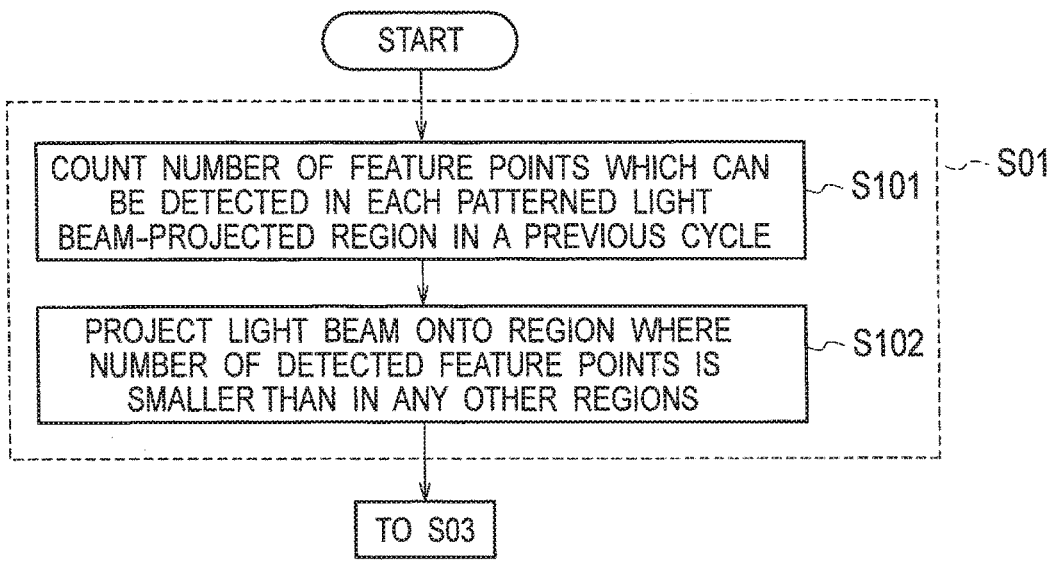
FIG. 12 is a flowchart showing details of step S01.

Next, referring to a flowchart in FIG. 12, descriptions will be provided for a detailed procedure for step S01 in FIG. 11. As shown in FIG. 12, in step S101, the patterned light beam controller 26 reads from the memory the positions of the respective feature points Te detected in the previous information process cycle by the feature point detector 23, and counts the number of feature points detected in each patterned light beam-projected region in the previous information process cycle. In step S102, the light projector 11 selectively projects the light beam onto a patterned light beam-projected region where the number of detected feature points is the smallest among the multiple patterned light beam-projected regions.

[First Modification]

Figure 13A:
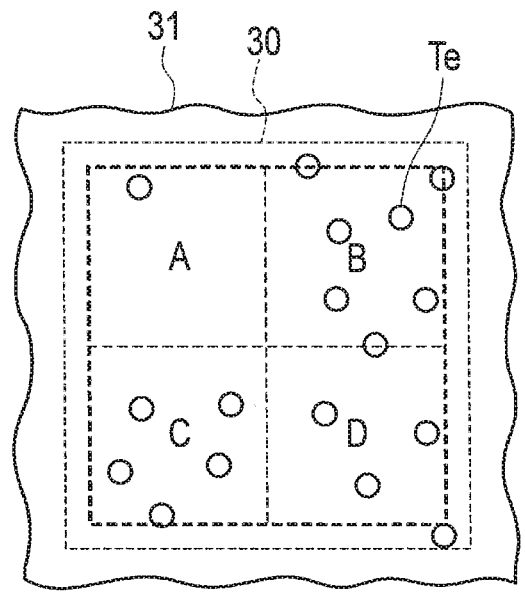
FIG. 13(a) is a schematic diagram showing an example of detected feature points.
Figure 13B:
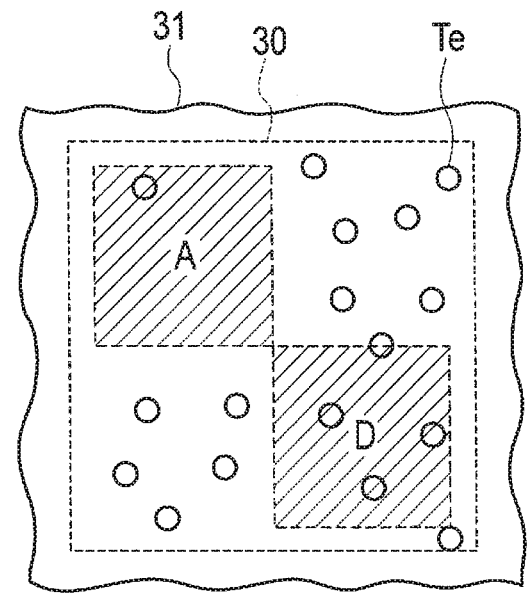
FIG. 13(b) is a schematic diagram showing an example of selected patterned light beam-projected regions.

Next, as a first modification, another example of how to project the patterned light beam will be described. The light projector 11 may be configured to selectively project the light beam onto multiple (for example, two) patterned light beam-projected regions where the number of feature points is smaller than in the others, instead of one patterned light beam-projected region where the number of feature points is the smallest among the patterned light beam-projected regions. For example, in the case shown in FIG. 13(a), the counted number of feature points detected as falling within the patterned light beam-projected region A is one; the region B, four; the region C, four; and the region D, three. The light projector 11 selectively projects the light beam onto the two patterned light beam-projected regions A, D where the number of feature points is smaller than in the others, as shown in FIG. 13(b).

Figure 14A:
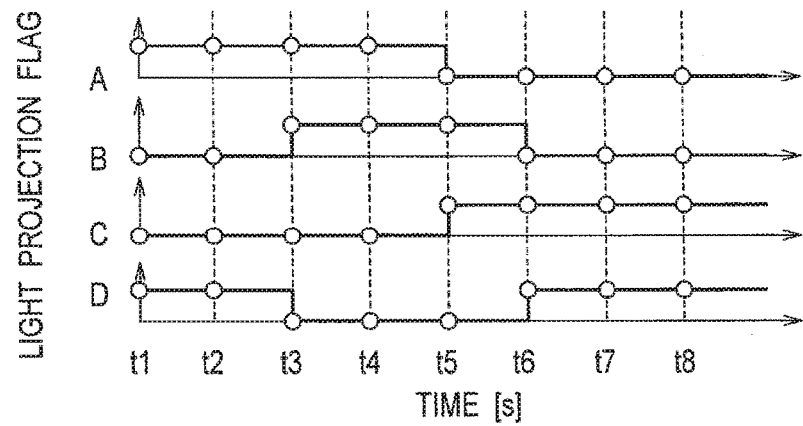
FIG. 14(*a*) is a graph showing how a light projection flag for each patterned light beam-projected region changes over time.
Figure 14B:
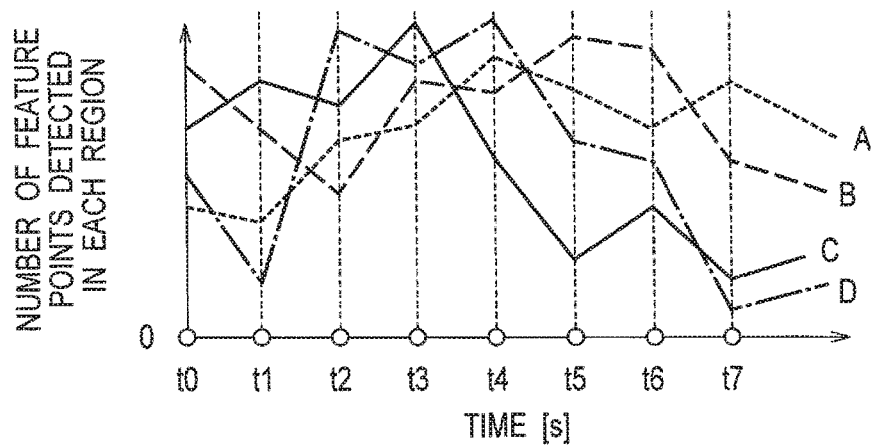

FIG. 14(a) shows how light projection flags for the respective patterned light beam-projected regions change with time. For each of the patterned light beam-projected regions A to D, FIG. 14(b) shows the number of feature points detected therein. For each of the patterned light beam-projected regions A to D, the light projection flag is set at "1" when the light beam is projected onto the region, and is set at "0" when no light beam is projected onto the region. Times t0 to t7 represent times at which the corresponding information process cycles are performed. At time t0, when the patterned light beam controller 26 counts the number of feature points detected in each of the patterned light beam-projected regions A to D, the number of detected feature points is smaller in the patterned light beam-projected regions A, D than in the other patterned light beam-projected regions, as shown in FIG. 14(b). Thus, as shown in FIG. 14(a), at time t1 of the next information process cycle, the light projector 11 selectively projects the light beam onto the two patterned light beam-projected regions A, D where the number of feature points at time t0 of the previous information process cycle is smaller than in the others.

Similarly, at times t1 to t6, for each of the patterned light beam-projected regions A to D, the patterned light beam controller 26 counts the number of feature points detected therein. Thus, at time t2 to t7 of the corresponding next information process cycles, the light projector 11 selectively projects the light beam onto two patterned light beam-projected regions where the number of feature points at times t1 to t6 of the previous information process cycles is smaller than in the others.

It should be noted that the configuration is made such that: no restriction is imposed on the number of patterned light beam-projected regions to be selected from the patterned light beam-projected regions A to D; and the light projector 11 selectively projects the light beam onto any patterned light beam-projected regions among the patterned light beam-projected regions A to D, where the number of feature points Te is equal to or less than a predetermined threshold value.

[Second Modification]

Figure 15:
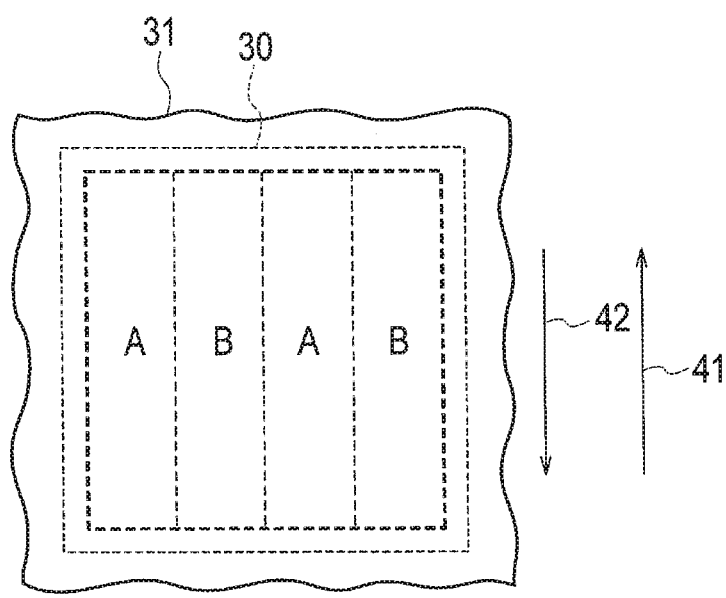
FIG. 15 is a schematic diagram showing an example of patterned light beam-projected regions alternately arranged one after another like longitudinal stripes.

Next, as a second modification, another example of how to project the patterned light beam will be described. As shown in FIG. 15, the patterned light beam controller 26 may be configured to set groups of patterned light beam-projected regions A and B each being a divided region in a longitudinal stripe shape extending in the movement direction 42 of the feature points, and to arrange the groups of the regions A and B alternately. Each of the groups of the patterned light beam-projected regions A and B includes two patterned light beam-projected regions, and the patterned light beam-projected regions A and B are alternately arranged in the vehicle-width direction. Either the patterned light beam-projected regions A or the patterned light beam-projected regions B are selected at one time. Incidentally, no specific restriction is imposed on the number of patterned light beam-projected regions A or the number of patterned light beam-projected regions B. Each of the groups of the patterned light beam-projected regions A and B may include three or more patterned light beam-projected regions.

Figure 16A:
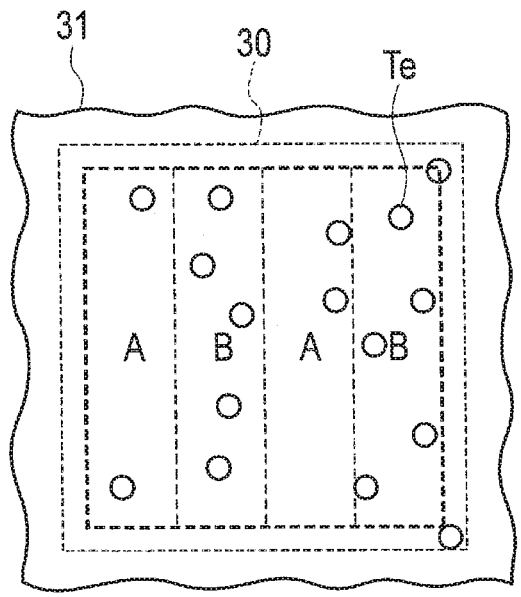
FIG. 16(*a*) is a schematic diagram showing an example of detected feature points.
Figure 16B:
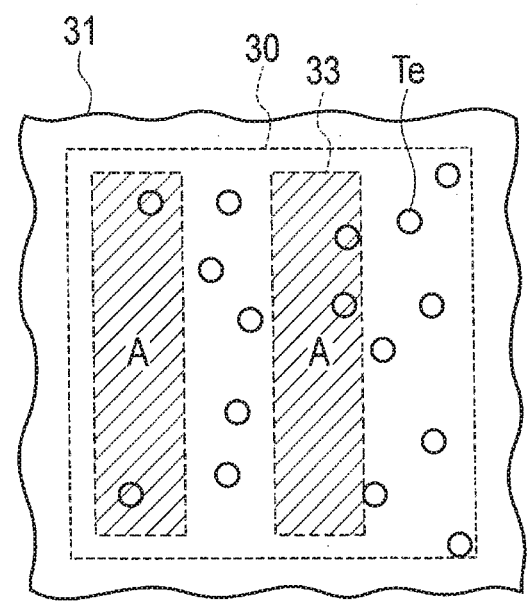

As shown in FIG. 16(a), the patterned light beam controller 26 counts a total number of feature points detected in the two patterned light beam-projected regions A, and a total number of feature points detected in the two patterned light beam-projected regions B. The total counted number of feature points detected as falling within the patterned light beam-projected regions A is four, and the total counted number of feature points detected as falling within the patterned light beam-projected regions B is ten. Thus, as shown in FIG. 16(b), the light projector 11 selectively projects the light beam onto the patterned light beam-projected regions A where the total number of feature points is smaller than in the others.

Figure 17A:
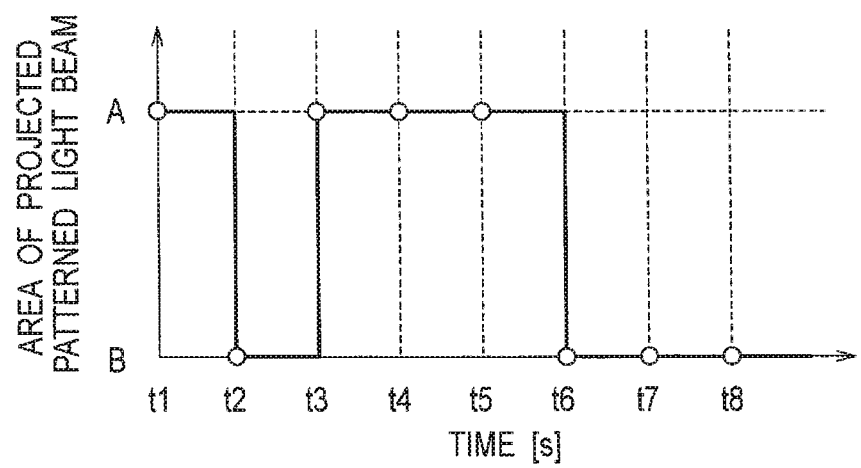
FIG. 17(*a*) is a graph showing how the selected set of patterned light beam-projected regions changes from one to another over time.
Figure 17B:
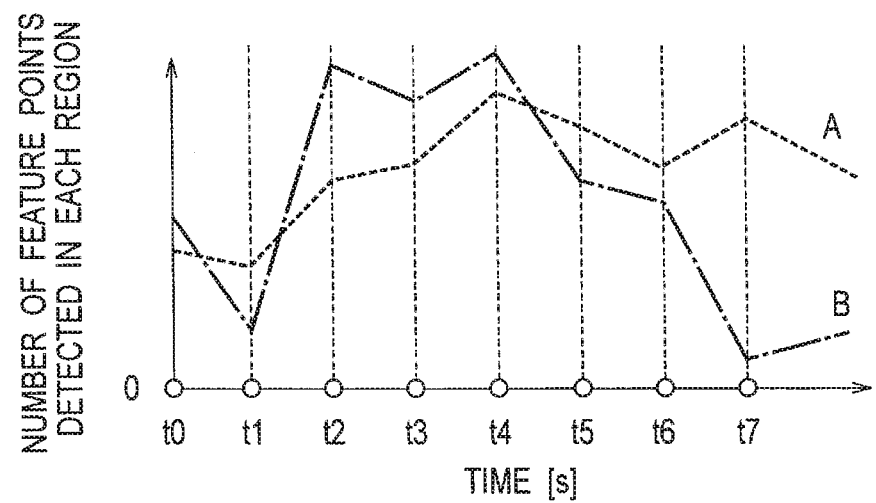

FIG. 17(a) shows temporal change in the patterned light beam-projected region between the patterned light beam-projected regions A and B. FIG. 17(b) shows the numbers of feature points detected in the patterned light beam-projected regions A and B. Times t0 to t7 represent times at which the corresponding information process cycles are performed. At time t0, when the patterned light beam controller 26 counts the numbers of feature points detected in the patterned light beam-projected regions A and B, the number of feature points detected in the patterned light beam-projected regions A is smaller than that in the regions B, as shown in FIG. 17(b). Thus, at time t1 of the next information process cycle, the light projector 11 selectively projects the light beam onto the patterned light beam-projected regions A where the number of feature points is smaller at time t0 of the previous information process cycle, as shown in FIG. 17(a). Similarly, at times t2 to t7, the light projector 11 selectively projects the light beam onto either the patterned light beam-projected regions A or the patterned light beam-projected regions B where the number of feature points is smaller at times t1 to t6 of the previous information process cycles, respectively.

[Third Modification]

Figure 18:
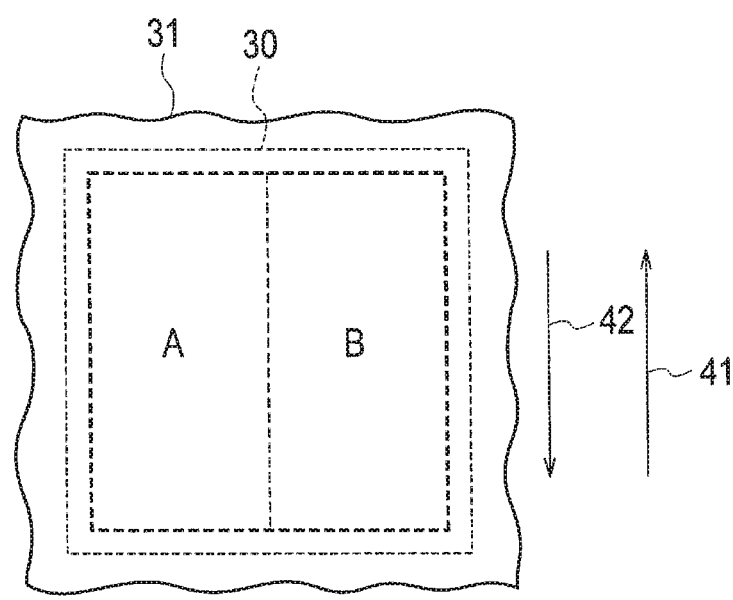
FIG. 18 is a schematic diagram showing an example of two patterned light beam-projected regions divided in a left-right direction.

Next, as a third modification, another example of how to project the patterned light beam will be described. As shown in FIG. 18, the patterned light beam controller 26 may be configured to set two patterned light beam-projected regions A, B divided in the vehicle-width (left-right) direction.

Figure 19A:
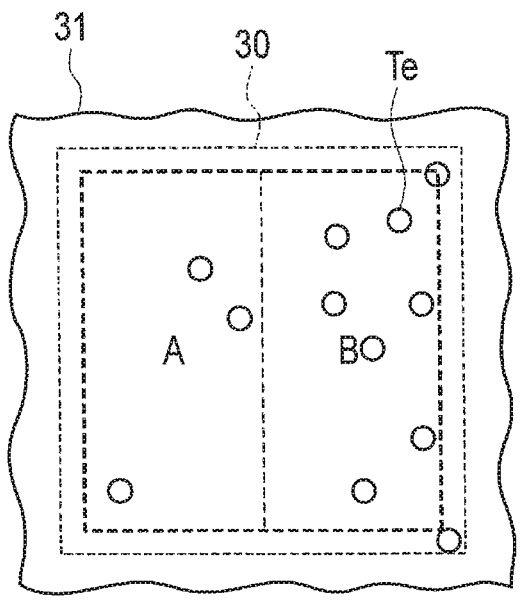
FIG. 19(*a*) is a schematic diagram showing an example of detected feature points.
Figure 19B:
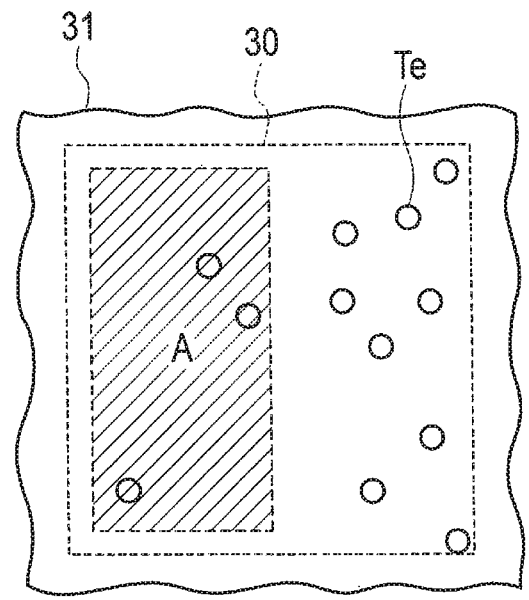

As shown in FIG. 19(a), the counted number of feature points detected as falling within the patterned light beam-projected region A is three; and the region B, seven. As shown in FIG. 19(b), the light projector 11 selectively projects the light beam onto the patterned light beam-projected region A where the number of feature points is smaller than that in the others. In that case, too, as shown in FIGS. 17(a) and 17(b), at times t1 to t7, the light projector 11 selectively projects the light beam onto either the patterned light beam-projected region A or the patterned light beam-projected region B where the number of feature points is smaller at times t0 to t6 of the previous information process cycles, respectively.

[Fourth Modification]

Figure 20:
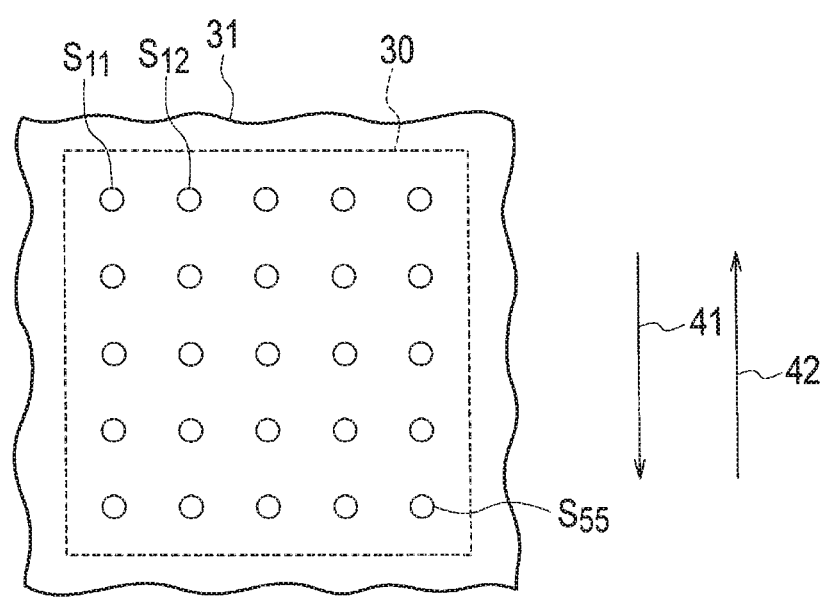
FIG. 20 is a schematic diagram showing an example of spotlights-projected regions.
Figure 21A:
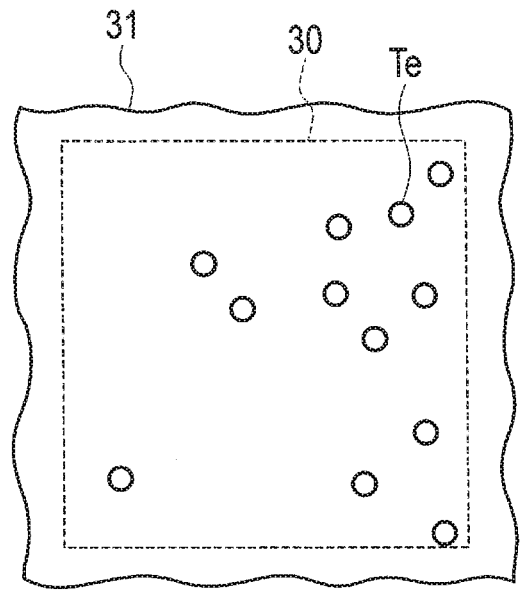
FIG. 21(*a*) is a schematic diagram showing an example of detected feature points.

Next, as a fourth modification, a case of setting positions onto which to project the patterned light beam depending on where the feature points Te are detected will be described. As shown in FIG. 20, the patterned light beam controller 26 sets m×n spotlights Smn (5×5 spotlights S11, S12, . . . , S55, in this case) as multiple patterned light beam-projected regions. Furthermore, as shown in FIG. 21(a), the feature point detector 23 detects the positions of the feature points Te.

Figure 21B:
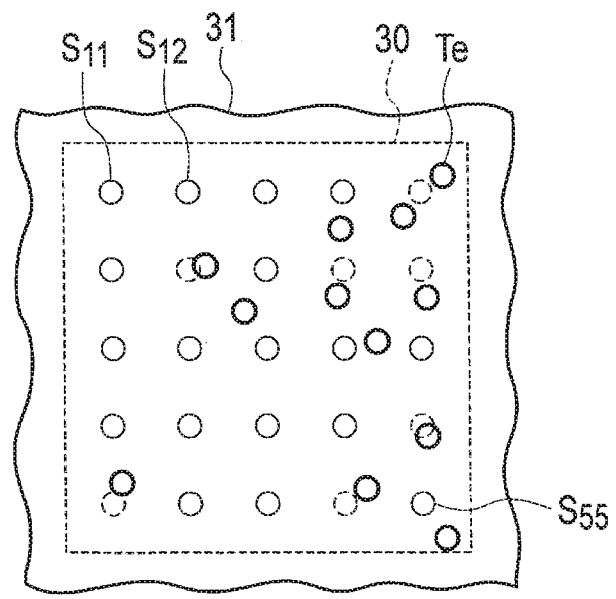

The patterned light beam controller 26 determines whether or not the positions of the feature points Te detected by the feature point detector 23 coincide with the positions (light beam-projected regions) of the spotlights S11, S12, . . . , S55. Since this determination needs to be made in a previous information process cycle, the feature points Te in a time of a current information process cycle are more likely to move from where they have been detected. With this taken into consideration, the patterned light beam controller 26 may be configured to determine whether or not the positions of the feature points Te coincide with wider areas including the patterned light beam-projected regions of the spotlights S11, S12, . . . , S55. Incidentally, the positions onto which turned-off spotlights would otherwise be projected can be obtained by estimation from the distance and orientation angle of the camera 12 relative to the road surface as well as the positions of the other spotlights. As shown in FIG. 21(b), the light projector 11 turns off spotlights onto the positions determined as coinciding with the feature points Te, and selectively projects spotlights onto the positions determined as not coinciding with the feature points Te.

Figure 22A:
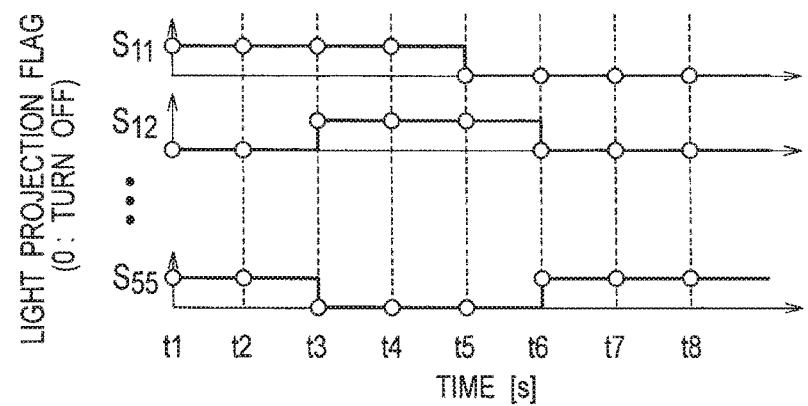
FIG. 22(*a*) is a graph showing how a light projection flag for each spotlight changes over time.
Figure 22B:
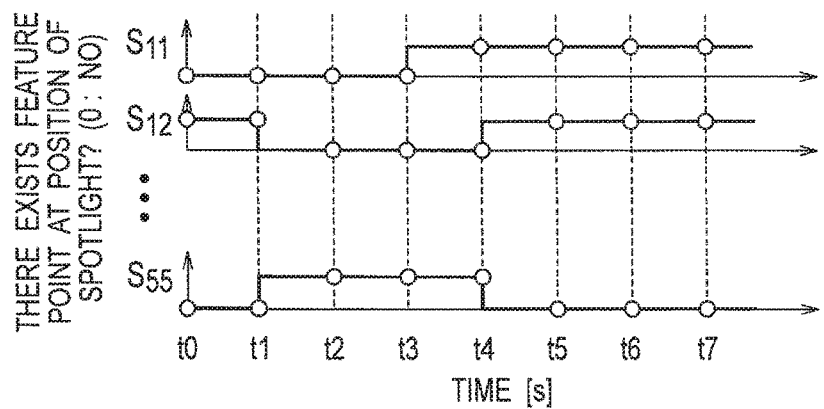

FIG. 22(a) shows how light projection flags for the respective spotlights S11, S12, . . . , S55 change over time. FIG. 22(b) shows how results of determining whether or not the feature points Te coincide with the positions of the spotlights S11, S12, . . . , S55 change over time. Times t0 to t7 represent times at which the corresponding information process cycles are performed. As shown in FIG. 22(b), at time t0, the patterned light beam controller 26 determines, for example, that no feature point Te coincides with either of the positions of the spotlights S11, S55, but that a feature point Te coincides with the position of the spotlight S12. As shown in FIG. 22(a), at time t1 of the next information process cycle, the light projector 11 turns off the spotlight S12 onto the position determined as coinciding with the feature point Te in the previous information cycle, and selectively turns on the spotlights S11, S55 onto the positions determined as not coinciding with the feature points Te in the previous information cycle. Similarly, at times t2 to t7, the light projector 11 turns off spotlights onto the positions determined as coinciding with the feature points Te at times t1 to t6 of the previous information cycles, and selectively turns on spotlights onto the positions determined as not coinciding with the feature points Te at times t1 to t6 of the previous information cycles.

[Effects of First Embodiment]

According to the first embodiment, depending on how the feature points Te are detected, the patterned light beam is selectively projected onto the specific patterned light beam-projected region A out of the multiple patterned light beam-projected regions A to D, as shown in FIGS. 9(a) and 9(b). Thereby, the patterned light beam is not projected on the regions where the number of feature points Te is larger than in the patterned light beam-projected region A. This makes it possible to easily identify the feature points Te while distinguishing between the feature points Te and the patterned light beam. Accordingly, the self-position of the vehicle 10 can be calculated accurately.

Furthermore, as shown in FIG. 15, the multiple patterned light beam-projected regions A, B are divided as alternatively-selectable regions in the longitudinal stripe shape extending in the movement direction of the feature points Te. The light projector 11 projects the light beam on either the multiple patterned light beam-projected regions A or the multiple patterned light beam-projected regions B where the number of detected feature points Te is smaller than in the others. This makes it possible to selectively project the patterned light beam using this simpler mechanism.

Moreover, as shown in FIG. 18, the multiple patterned light beam-projected regions A, B are two regions divided in the vehicle-width direction (left-right direction). The light projector 11 projects the light beam on either the patterned light beam-projected region A or the patterned light beam-projected region B where the number of detected feature points Te is smaller than in the other. This makes it possible to selectively project the patterned light beam using this simpler mechanism.

Besides, as shown in FIG. 21(b), the positions of the patterned light beam-projected regions (spotlights) S11, S12, . . . , S55 are set depending on where the feature points Te are detected. This makes it possible to easily identify the feature points Te while distinguishing between the feature points Te and the patterned light beam, even in the case where the patterned light beam-projected regions are comparatively small like this.

(Second Embodiment)

[Hardware Configuration]

Figure 23:
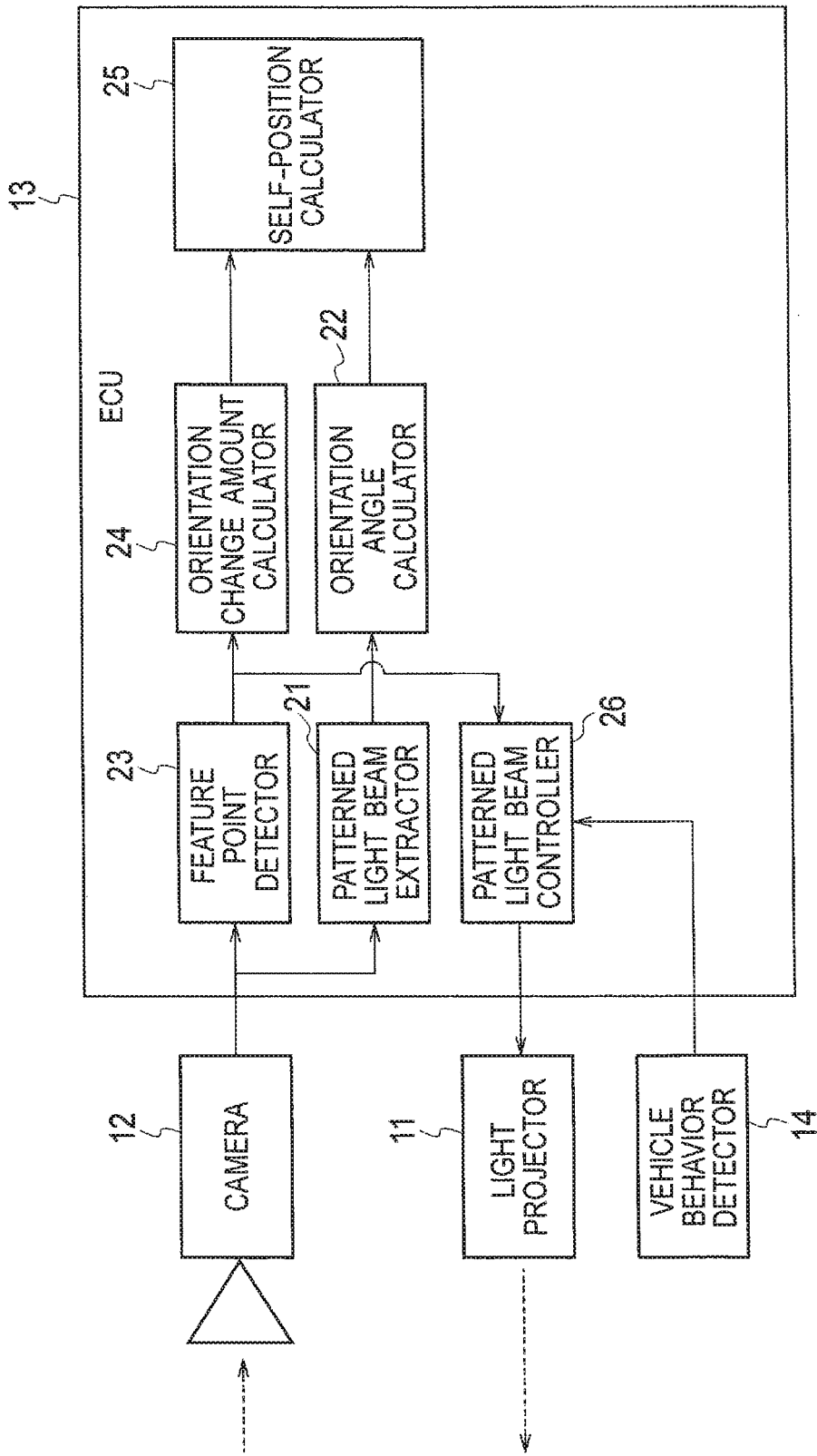
FIG. 23 is a block diagram showing an overall configuration of a self-position calculating apparatus of a second embodiment.

A self-position calculating apparatus of a second embodiment differs from the self-position calculating apparatus of the first embodiment in that as shown in FIG. 23, the self-position calculating apparatus of the second embodiment includes a vehicle behavior detector 14 in addition to the configuration of the self-position calculating apparatus of the first embodiment. A wheel speed sensor configured to detect a vehicle speed, and a yaw rate sensor configured to detect a speed of the vehicle in the lateral direction may be used as the vehicle behavior detector 14. The other configuration of the self-position calculating apparatus of the second embodiment is substantially the same as that of the self-position calculating apparatus of the first embodiment. For this reason, duplicate descriptions will be omitted.

The patterned light beam controller 26 estimates directions and amounts of movements of the feature points Te, and sets a position of the patterned light beam depending on the estimated directions and amounts of the movements of the feature points Te. The directions and amounts of the movements of the feature points Te can be estimated from amounts of movements of the vehicle which are obtained in two information process cycles, or the previous and current information process cycles. Otherwise, the directions and amounts of the movements of the feature points Te can be estimated from the vehicle speed and yaw rate which are obtained by the vehicle behavior detector 14.

Figure 24A:
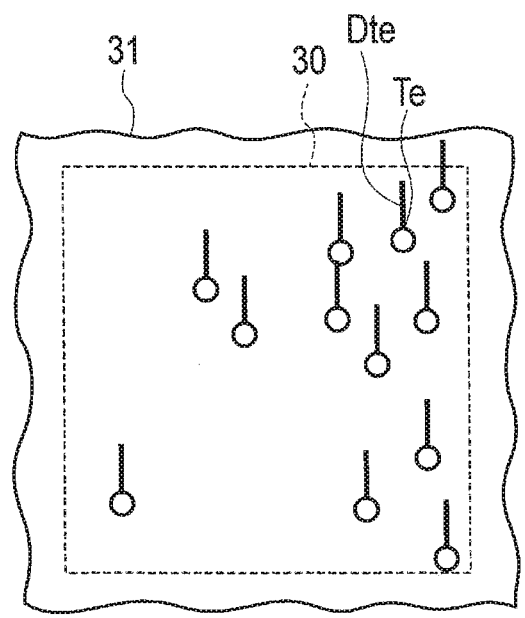
FIG. 24(*a*) is a schematic diagram showing an example of detected feature points.
Figure 24B:
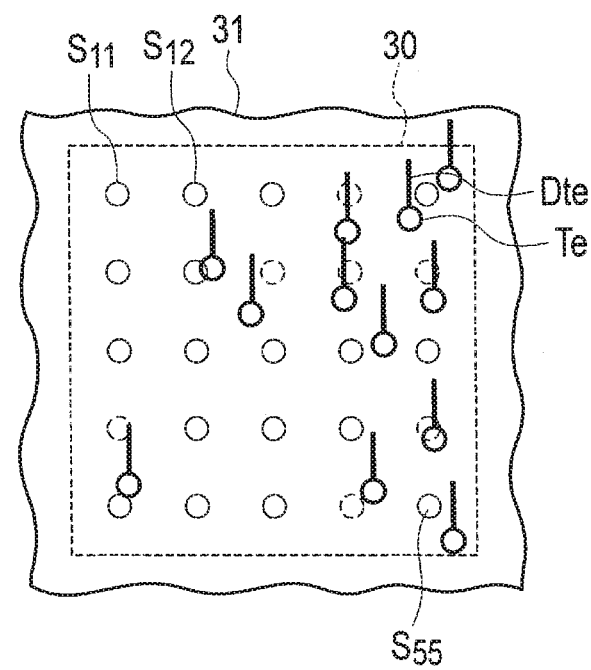

FIG. 24(a) shows feature points Te detected in one information process cycle before. In FIG. 24(a), the estimated direction and amount of the movement of each feature point Te are represented by a corresponding vector Dte. For each feature point Te, the patterned light beam controller 26 estimates the position of the feature point Te in the current information process cycle from the estimated direction and amount of the movement of the feature point Te, and estimates whether or not the position of the feature point Te coincides with a corresponding one of the spotlights S11, S12, . . . , S55. As shown in FIG. 24(b), the patterned light beam controller 26 turns off spotlights onto the positions estimated as coinciding with the feature points Te in the current information process cycle, and selectively turns on spotlights onto the positions estimated as not coinciding with the feature points Te in the current information process cycle.

Figure 25A:
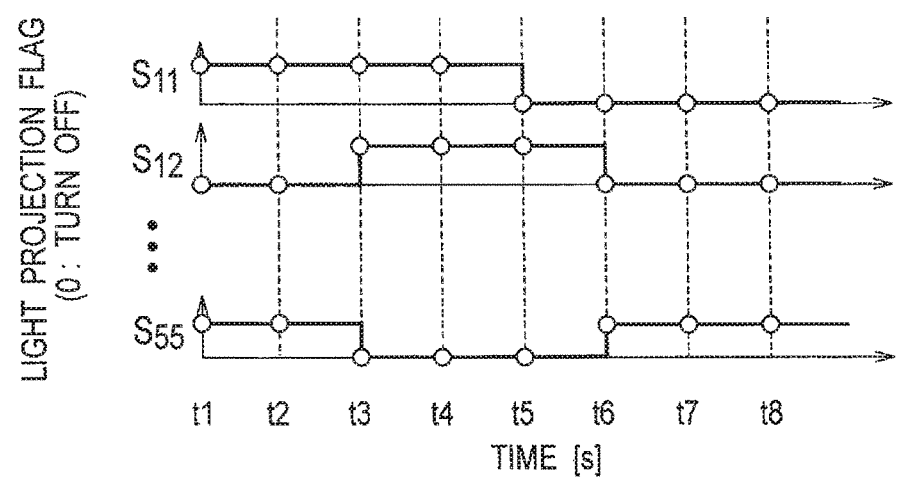
FIG. 25(*a*) is a graph showing how a light projection flag for each spotlight changes over time.
Figure 25B:
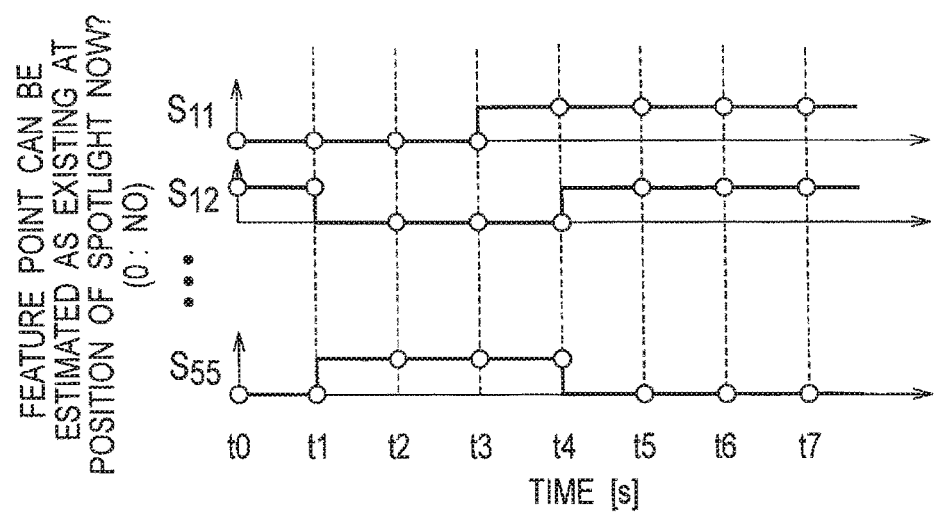

FIG. 25(a) shows how light projection flags for the respective spotlights S11, S12, . . . , S55 change over time. FIG. 25(b) shows how results of estimating whether or not the feature points Te will exist at the positions of the respective spotlights S11, S12, . . . , S55 change over time. Times t0 to t7 represent times at which the corresponding information process cycles are performed. As shown in FIG. 25(b), at time t0, the patterned light beam controller 26 estimates that no feature point Te will exist at either of the positions of the spotlights S11, S55 at time t1 of the next information process cycle, and that a feature point Te will exist at the position of the spotlight S12 at time t1 of the next information process cycle. As shown in FIG. 25(a), at time t1 of the next information process cycle, the light projector 11 turns off the spotlights S12 onto the positions where feature points Te are estimated as existing, and selectively turns on the spotlight S11, S55 onto the position where no feature points Te are estimated as existing. Similarly, at times t1 to t6, the patterned light beam controller 26 estimates whether or not the feature points Te will exist at the positions of the spotlights at times t2 to t7 of the next information process cycles. Thus, at times t2 to t7 of the next information process cycles, the light projector 11 turns off spotlights onto the positions where feature points Te are estimated as existing, and selectively turns on spotlights onto the positions where no feature points Te are estimated as existing.

Figure 26:
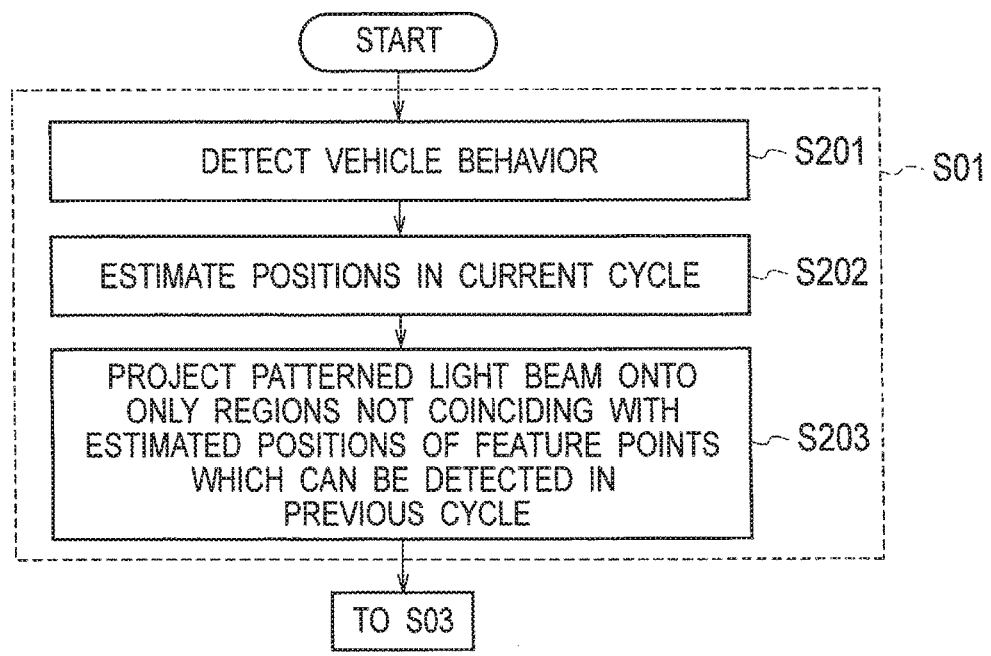
FIG. 26 is a flowchart showing an example of details of step S01 of the second embodiment.

Next, referring to FIG. 26, descriptions will be provided for details of step S01 of a self-position calculating method of the second embodiment. In step S201, the vehicle behavior detector 14 detects the vehicle speed and the yaw rate. In step S202, based on the vehicle speed and the yaw rate detected by the vehicle behavior detector 14, the patterned light beam controller 26 estimates the amounts and directions of the movements of the feature points Te detected in the previous information process cycle, and further estimates the positions of the feature points Te in the current information process cycle. In step S203, the patterned light beam controller 26 determines whether or not the estimated positions of the feature points Te coincide with the positions of the spotlights S11, S12, . . . , S55. As results of the determinations made by the patterned light beam controller 26, the light projector 11 turns off spotlights onto the positions determined as coinciding with the estimated positions of the feature points Te, and projects spotlights only onto the positions determined as not coinciding with the estimated positions of the feature points Te.

[Modification]

Figure 27:
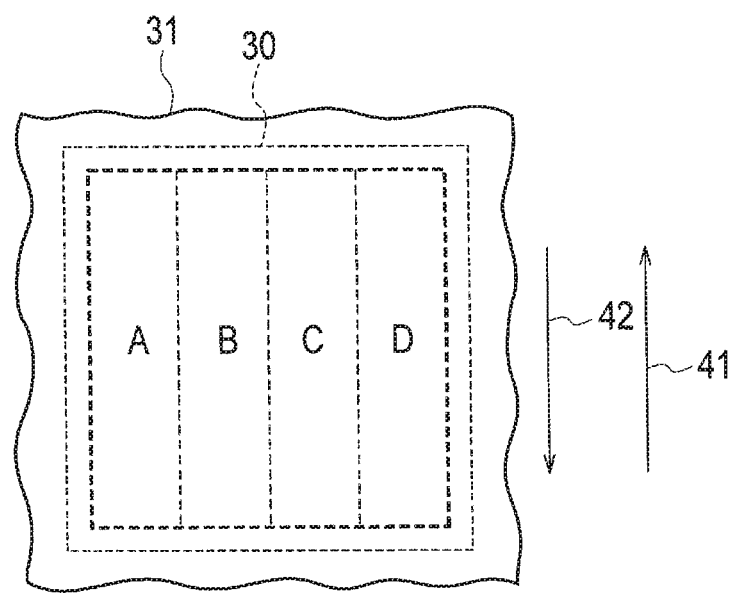
FIG. 27 is a schematic diagram showing an example of four patterned light beam-projected regions divided in a vehicle-width direction.

Next, descriptions will be provided for a modification of the case where the positions of the patterned light beam are set depending on the movement directions of the feature points Te. As shown in FIG. 27, the patterned light beam controller 26 sets four patterned light beam-projected regions A, B, C, D, which are divided in the vehicle-width direction (left-right direction) and each extend in the movement direction 42 of the feature points Te. As indicated by the movement direction 42 of the feature points Te in FIG. 27, the feature points Te appear on images obtained by the camera 12, and thereafter move out of the images while moving mainly in one direction. With this taken into consideration, feature-points increase/decrease prediction areas are provided in a part of the image capturing area from which the feature points Te appear on the images; it is determined in the previous information process cycle whether or not there exist feature points Te in the feature-points increase/decrease prediction areas; and thereby the light beam is selectively projected onto patterned light beam-projected regions where the number of feature points Te is expected to decrease in the current information process cycle.

Figure 28A:
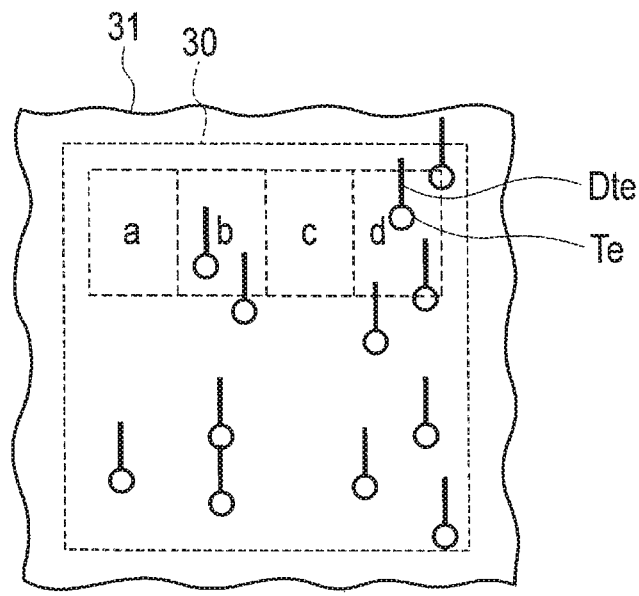
FIG. 28(*a*) is a schematic diagram showing a method of setting feature-points increase/decrease prediction areas, and an example of detected feature points.
Figure 28B:
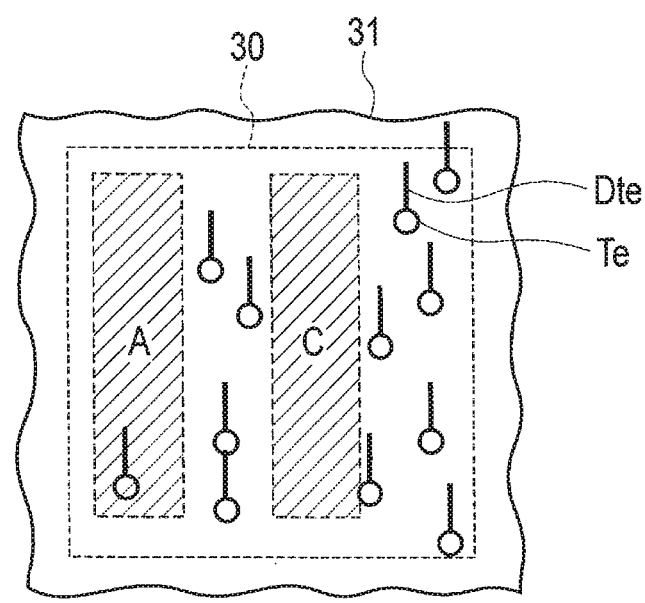

For example, as shown in FIG. 28(a), the patterned light beam controller 26 sets the feature-points increase/decrease prediction areas a to d in an upper part of the image capturing area 30. The feature-points increase/decrease prediction areas a to d respectively correspond to the patterned light beam-projected regions A to D, and are located at the same positions in the vehicle-width direction as are the patterned light beam-projected regions A to D. The patterned light beam controller 26 determines whether or not there exist feature points Te in each of the feature-points increase/decrease prediction areas a to d, and determines that no feature points Te exist in either of the feature-points increase/decrease prediction areas a, c. As shown in FIG. 28(b), the light projector 11 selectively projects the light beam onto the patterned light beam-projected regions A, C situated in the same columns as are the feature-points increase/decrease prediction areas a, c. Incidentally, the patterned light beam controller 26 may be configured to count the number of feature points Te for each of the feature-points increase/decrease prediction areas a to d instead of determining whether or not there exist feature points Te in each of the feature-points increase/decrease prediction areas a to d, and to thus project the light beam onto the regions where the number of feature points Te is smaller than in the others.

Figure 29A:
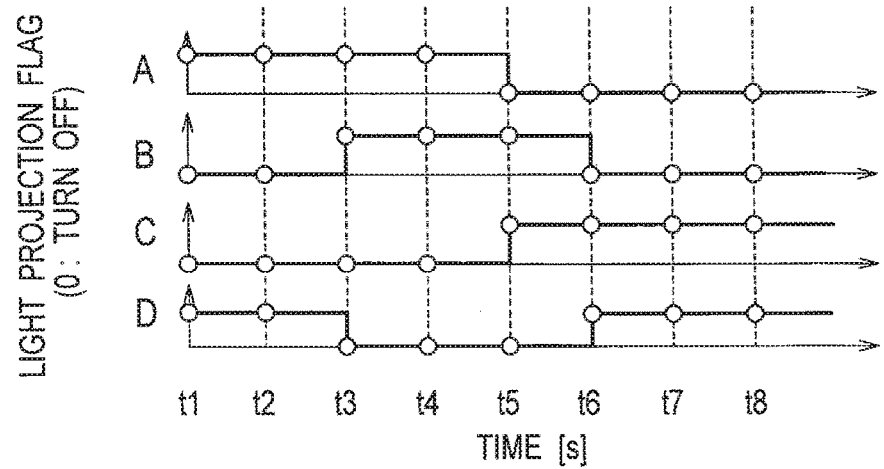
FIG. 29(*a*) is a graph showing how a light projection flag for each spotlight changes over time.
Figure 29B:
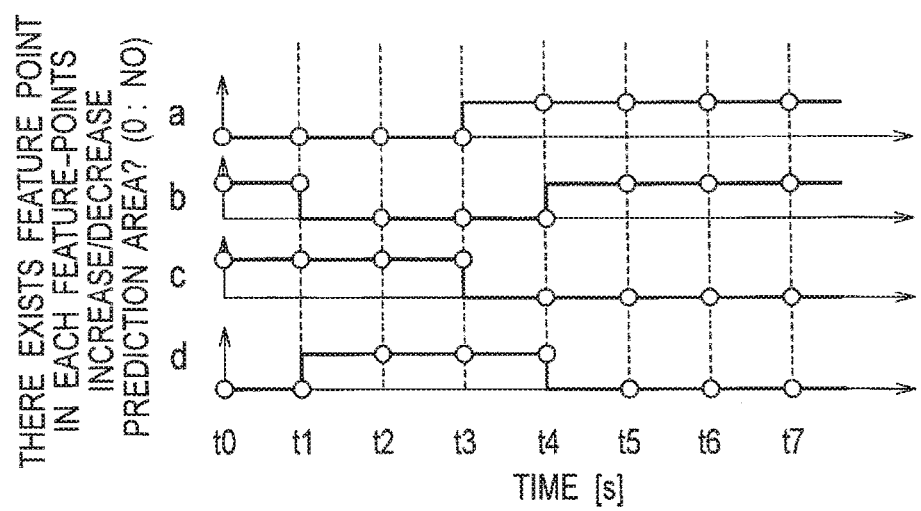

FIG. 29(a) shows how light projection flags for the respective patterned light beam-projected regions A to D change over time. FIG. 29(b) shows how a result of determining whether or not there exist feature points Te in each of the feature-points increase/decrease prediction areas changes over time. Times t0 to t7 represent times at which the corresponding information process cycles are performed. As shown in FIG. 29(b), at time t0, the patterned light beam controller 26 determines that no feature points Te exist in either of the feature-points increase/decrease prediction areas a, d, and that feature points Te exist in the feature-points increase/decrease prediction areas b, c. As shown in FIG. 29(a), at time t1 of the next information process cycle, the light projector 11 selectively projects the light beam onto the patterned light beam-projected regions A, D situated in the same column as are the feature-points increase/decrease prediction areas a, d where no feature points Te are determined as existing in the previous information cycle. Similarly, at times t2 to t7, the patterned light beam controller 26 causes the light beam to be selectively projected onto patterned light beam-projected regions corresponding to feature-points increase/decrease prediction areas where no feature points Te are determined as existing at times t1 to t6 of the previous information cycles.

[Effect of Second Embodiment]

According to the second embodiment, depending on how the feature points Te are detected, the light beam is selectively projected onto specific patterned light beam-projected regions (spotlights) out of the multiple patterned light beam-projected regions S11, S12, . . . , S55. This makes it possible to easily identify the feature points Te while distinguishing between the feature points Te and the spotlights S11, S12, . . . , S55. Accordingly, the self-position of the vehicle 10 can be calculated accurately.

Furthermore, the current positions of the feature points Te are estimated based on the movement directions of the feature points Te, and the positions of the patterned light beam-projected regions (spotlights) S11, S12, . . . , S55 are set. This makes it possible to further reduce the number of coincidences between the spotlights S11, S12, . . . , S55 and the feature points Te in the current information process cycle.

(Other Embodiments)

Although the contents of the present invention have been described based on the first and second embodiments, the present invention is not limited to what has been described above. It is obvious to those skilled in the art that the present invention can be variously modified and improved.

Figure 30:
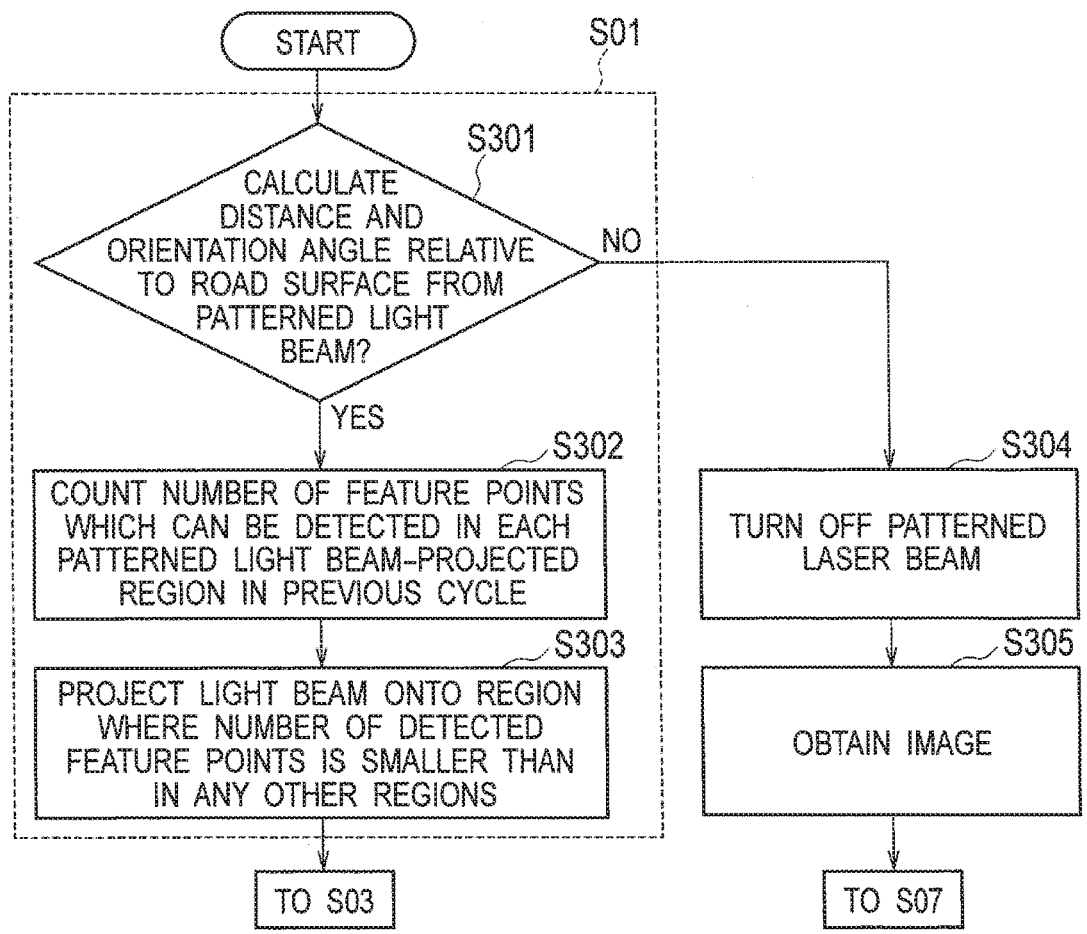
FIG. 30 shows an example of a flowchart to be followed when it is determined whether to calculate the angle and orientation relative to the road surface.

Referring to FIG. 30, descriptions will be provided for an example in which the process in step S05 of calculating the distance and orientation angle relative to the road surface from the patterned light beam is performed only when needed. In step S301 in FIG. 30, the ECU 13 determines whether to perform the process in step S05, or whether to calculate the distance and orientation angle relative to the road surface. If the process in step S05 of calculating the distance and orientation angle relative to the road surface from the position of the patterned light beam is performed, the flow proceeds to step S302, where the patterned light beam controller 26 counts the number of feature points Te detected in each patterned light beam-projected region in the previous information process cycle. Subsequently, in step S303, the light projector 11 selectively projects the patterned light beam onto, for example, a patterned light beam-projected region where the number of detected feature points Te is the smallest. Thereafter, the flow proceeds to step S03 in FIG. 11. On the other hand, if the process in step S05 of calculating the distance and orientation angle relative to the road surface from the position of the patterned light beam is not performed, the flow proceeds to step S304, where the light projector 11 turns off the patterned light beam. Subsequently, in step S305, the camera 12 obtains the image. Thereafter, the flow proceeds to the procedure in step S07 in FIG. 11.

REFERENCE SIGNS LIST 10 vehicle
11 light projector
12 camera (image capturing unit)
13 ECU
21 patterned light beam extractor
22 orientation angle calculator
23 feature point detector
24 orientation change amount calculator
25 self-position calculator
26 patterned light beam controller
31 road surface
32a, 32b patterned light beam
A, B, C, D, S11 to S55 patterned light beam-projected region
Te feature point

The invention claimed is:

1. A self-position calculating apparatus comprising:
   a laser pointer and a diffraction grating configured to project a patterned light beam onto a road surface around a vehicle;
   a camera installed in the vehicle, and configured to capture and obtain an image of the road surface around the vehicle covering an area of the projected patterned light beam;
   an orientation angle calculation processor configured to calculate an orientation angle of the vehicle relative to the road surface from a shape of the patterned light beam on the image obtained with the camera;
   a feature point detection processor configured to detect a plurality of feature points on the road surface from the image obtained with the camera;
   an orientation change amount calculation processor configured to calculate an amount of change in the orientation of the vehicle based on temporal changes in the plurality of feature points on the road surface detected by the feature point detection processor; and
   a self-position calculation processor configured to calculate a current position and a current orientation angle of the vehicle by adding the amount of change in the orientation to an initial position and an initial orientation angle of the vehicle relative to the road surface, wherein
   depending on a detection result of the feature points on the road surface detected by the feature point detection processor, the laser pointer and the diffraction grating selectively project the patterned light beam onto a specific patterned light beam-projected region out of a plurality of patterned light beam-projected regions.

2. The self-position calculating apparatus according to claim 1, wherein
   the plurality of patterned light beam-projected regions form groups of regions divided in a longitudinal stripe shape and each extending in a movement direction of the feature points, the groups of regions alternately arranged, and
   the laser pointer and the diffraction grating projects the patterned light beam onto one of the groups of the patterned light beam-projected regions where the number of detected feature points is smaller than in any other group.

3. The self-position calculating apparatus according to claim 1, wherein
   the plurality of patterned light beam-projected regions are two regions divided in a vehicle-width direction,
   the laser pointer and the diffraction grating project the patterned light beam onto one of the patterned light beam-projected regions where the number of detected feature points is smaller.

4. The self-position calculating apparatus according to claim 1, wherein the laser pointer and the diffraction grating turn off the patterned light beam onto positions corresponding to positions where the feature points are detected.

5. The self-position calculating apparatus according to claim 1, wherein the laser pointer and the diffraction grating turn off the patterned light beam onto positions corresponding to the movement direction of the feature points.

6. A self-position calculating method comprising:
   a patterned light beam projecting step of causing a laser pointer and a diffraction grating installed in a vehicle to project a patterned light beam onto a road surface around a vehicle;
   a step of causing a camera installed in the vehicle to obtain an image of the road surface around the vehicle covering an area of the projected patterned light beam;
   a step of causing a controller of the vehicle to calculate an orientation angle of the vehicle relative to the road surface from a position of the patterned light beam on the obtained image;
   a step of causing the controller to detect a plurality of feature points on the road surface from the obtained image;
   a step of causing the controller to calculate an amount of change in the orientation of the vehicle based on temporal changes in the plurality of detected feature points on the road surface; and
   a step of causing the controller to calculate a current position and a current orientation angle of the vehicle by adding the amount of change in the orientation to an initial position and an initial orientation angle of the vehicle relative to the road surface, wherein
   the patterned light beam projecting step selectively projects the patterned light beam onto a specific patterned light beam-projected region out of a plurality of patterned light beam-projected regions depending on how the feature points on the road surface are detected.

* * * * *